United States Patent
Iijima et al.

[11] Patent Number: 5,936,378
[45] Date of Patent: Aug. 10, 1999

[54] MOTOR CONTROLLER

[75] Inventors: Tomokuni Iijima, Moriguchi; Kazushige Narazaki, Katano; Yoshiaki Igarashi, Ikoma; Satoshi Tamaki, Hirakata; Masaki Tagome, Shijonawate; Mineaki Isoda, Kadoma, all of Japan

[73] Assignee: Matsushita Electric Industrial Co., Ltd., Osaka, Japan

[21] Appl. No.: 09/047,128

[22] Filed: Mar. 24, 1998

[30] Foreign Application Priority Data

Mar. 27, 1997 [JP] Japan ................................. 9-075419

[51] Int. Cl.$^6$ ....................................................... H02P 5/28
[52] U.S. Cl. ........................... 318/807; 318/254; 318/716; 318/802; 318/809
[58] Field of Search .................................. 318/254, 802, 318/798–805, 716, 809, 807

[56] References Cited

U.S. PATENT DOCUMENTS 4,649,331 3/1987 Jahns .
5,652,495 7/1997 Narazaki et al. .

FOREIGN PATENT DOCUMENTS 60219987 11/1985 Japan .
8-266099 10/1996 Japan .

Primary Examiner—William M. Shoop, Jr.
Attorney, Agent, or Firm—Panitch Schwarze Jacobs & Nadel, P.C.

[57] ABSTRACT

A motor controller comprising drive unit for supplying power to the stator windings of a motor based on a current command, a stator current detection unit for detecting the stator current flowing in the stator windings, a saturation degree production unit for producing the saturation degree data indicating the extent to which the stator current deviates from the current command based on the current command and the stator current, a reference value production unit for producing a reference value of the saturation degree, a gain production unit for producing a gain indicating the rate at which the current command is changed, and a current command production unit for producing the current command data based on the saturation degree, the reference value and the gain, wherein the gain production unit produces the gain data based on at least one of the rotational speed of the motor and the current command.

30 Claims, 21 Drawing Sheets

MOTOR CONTROLLER

BACKGROUND OF THE INVENTION

The present invention relates to a motor controller for realizing a stable output torque in a wide range of rotational speeds of a motor used for an electric vehicle or the like subjected to field-weakening control with high efficiency.

In a brushless motor having no physical commutation mechanism, the stator current flowing in the stator windings is controlled in synchronism with the rotational position of the rotor and a predetermined output torque is generated by rotating the rotor in a predetermined direction. The brushless motor which forms a magnetic field by a permanent magnet is high in efficiency and is widely used for electric vehicles.

Now, an example of the prior art will be explained after describing the features and the field-weakening control of the brushless motor.

[Features of brushless motor]

A permanent magnet is arranged on the rotor of the brushless motor thereby to form a magnetic field. The same direction as the magnetic field is called a d-axis, and the direction displaced by 90° electrical angle from the d-axis as a q-axis. The q-axis is in the same direction as the counter electromotive force excited in the stator winding by the magnetic field. The current phase is advanced by adding a current in the direction of d-axis. As shown in FIG. 20, the magnitude of current is designated as I, the current component in the direction along d-axis as a d-axis current Id, the current component flowing q-axis as a q-axis current Iq, and the current phase as β.

When a current is supplied to the stator windings, the q-axis component Vq and the d-axis component Vd of the terminal voltage are expressed by equation 1. Also, the output torque Trq of the brushless motor is expressed by equation 2. In these equations, ωe is the electrical angular speed, R the resistance of the stator windings, ψ the flux linkage of the magnetic field, Ld the d-axis inductance, and Lq the q-axis inductance.

$$\begin{cases} Vd = R \cdot Id + \omega e \cdot Lq \cdot Iq \\ Vq = \psi \cdot \omega e + R \cdot Iq - \omega e \cdot Ld \cdot Id \end{cases} \quad (1)$$

$$Trq \begin{cases} = \psi \cdot Iq + (Lq - Ld) \cdot Iq \cdot Id \\ = \psi \cdot I \cdot \cos\beta + \frac{1}{2}(Lq - Ld) \cdot I^2 \cdot \sin 2\beta \end{cases} \quad (2)$$

In a Surface Permanent Magnet motor (SPM motor) with permanent magnet arranged on the surface thereof, the d-axis inductance Ld is equal to the q-axis inductance Lq (Ld=Lq). Therefore, the second term of equation 2 is 0. As long as the magnitude I of the current is constant, the output torque Trq becomes maximum when the current phase β is 0°. With an Interior Permanent Magnet motor (IPM motor) with permanent magnet buried in the rotor, on the other hand, the d-axis inductance Ld is smaller than the q-axis inductance Lq (Ld<Lq). The first term of equation 2, therefore, assumes a maximum value when the current phase β is 0°, and the second term assumes a maximum value when β=45°. Consequently, as shown in FIG. 21, the output torque assumes a maximum value T0 for a certain value (β0°) of β between 0° and 45°.

[Field-weakening control]

Assume that the brushless motor is in dynamic mode. As shown in the vector diagram (FIG. 22A) for field-weakening control, an induced voltage ωe·ψ increases with the increase in the rotational speed ω of the brushless motor. Once a voltage value V which is a vectorial sum of ωe·ψ, R·Iq and ω·Lq·Iq reaches a voltage-limit circle, the brushless motor cannot increase the rotational speed any more than ω associated with the voltage value V that has reached the voltage-limit circle.

In the case where the power supply is a battery, the terminal voltage and the current value of the battery undergo a change with the degeneration of the battery. For simplicity's sake, however, the terminal voltage of the battery (radius of the voltage-limit circle) is assumed to be constant.

Now, assume that the rotational speed of the brushless motor is to be increased. As shown in FIG. 22, the voltage ω·Ld·Id in the direction returning to the interior of the voltage-limit circle is generated by supplying Id. As a result, a voltage margin is generated for increasing the rotational speed of the brushless motor (FIG. 22B). In the case where the rotational speed of the brushless motor is constant, the q-axis current Iq can be supplied by an amount equivalent to the voltage margin thus generated, so that an additional output torque can be generated by the brushless motor. In the case where the current value is constant, on the other hand, the rotational speed ω can be increased by an amount equivalent to the voltage margin generated (FIG. 22C). As described above, the control operation in which the d-axis current Id is supplied to the stator windings to generate a voltage margin is called the field-weakening control.

Assume that the current phase is changed while maintaining a constant current magnitude. The d-axis current Id increases, so that a voltage margin is generated thereby to produce the effect of the field-weakening control. At the same time, the q-axis current Iq, and hence, Lq·Iq is reduced, resulting in a smaller voltage value V thereby to generate an additional voltage margin.

The d-axis current Id for generating a voltage margin can be a minimum current required for the terminal voltage supplied to the brushless motor to return into the voltage-limit circle. In the case where the d-axis current Id more than the required minimum flows, the copper-loss increases and the efficiency of the brushless motor is adversely affected.

As far as the voltage has a margin, the stator current faithfully follows the stator current command as shown in FIG. 7A. Once the voltage margin is lost, however, the stator current cannot follow the stator current command as shown in FIG. 7B.

[Example of prior art]

A conventional field-weakening control system for the brushless motor is described in Industrial Power and Electricity Application Research Society Materials IEA-92-30, Institute of Electrical Engineers of Japan.

The d-axis current command Id* is calculated according to equation 3 thereby to effect the field-weakening control.

$$Id^* = Id^*max \cdot \frac{\omega - \omega base}{\omega max - \omega base} \quad (3)$$

where ωbase is a basic rotational speed, ωmax is a maximum rotational speed, and Id*max is a d-axis current associated with the maximum rotational speed ω.

Also, Collection of Lectures No.74, pp.310–315, at General Assembly of Industrial Application Section, Institute of Electrical Engineers of Japan, held in 1991, discloses a method of field-weakening control, in which the d-axis current command Id* is calculated using a target rotational speed, a d-axis winding reactance, a q-axis winding reactance, a stator winding resistance, and no-load induced voltage at unit speed, etc.

In the actual brushless motor, however, the motor constants change with the change in resistance value according to the operating conditions, the change in inductance due to saturation of magnetic fluxes and secular variations. Therefore, the d-axis current command Id* calculated from the above-mentioned equation for the above-mentioned conventional art is not optimum for field-weakening control.

In the motor controller described in U.S. Pat. No. 5,652,495, a current error constituting the difference between the stator current command and the stator current is detected, and the d-axis current command Id* is increased when the current error is large, while the d-axis current command Id* is reduced when the current error is small, thereby to effect feedback control. Then, a required minimum of d-axis current command Id* can always be realized, and the increase in copper-loss due to the increased d-axis current Id is minimized. As a result, it is possible to converge to an operating point for field-weakening control at real time with high efficiency.

In the case of using the above-mentioned feedback control based on a current error, a gain indicating the rate of changing the d-axis current command Id* and a reference value indicating a reference current error are designed with a margin in order to secure stable operation in all the operating areas. As a result, an application over a wide rotational speed area makes it impossible to secure an optimum gain and an optimum reference value in a part of the operating areas. Thus, it sometimes occurs that an optimum response and an optimum output torque cannot be secured.

An object of the present invention is to further improve the technique described in U.S. Pat. No. 5,652,495, and in particular to realize a safe, stable driving operation of an electric vehicle by generating a smooth torque not in conflict with an operation command under any operating conditions.

BRIEF SUMMARY OF THE INVENTION

In order to solve the above-mentioned problems, according to an aspect of the invention, there is provided a motor controller comprising drive means for supplying power to the stator windings of a motor in response to a current command, stator current detection means for detecting the stator current flowing in the stator windings, saturation degree production means for producing the saturation degree data indicating the extent to which the stator current deviates from the current command, based on the current command and the stator current, reference value production means for producing a reference value of the saturation degree, gain production means for producing a gain data indicating the rate at which the current command is changed, and current command production means for producing the current command data based on the saturation degree, the reference value and the gain, wherein the gain production means produces the gain data based on at least one of the motor rotational speed and the current command.

According to another aspect of the invention, there is provided a motor controller comprising drive means for supplying power to the stator windings of a motor in response to a current command, stator current detection means for detecting the stator current flowing in the stator windings, saturation degree production means for producing the saturation degree data indicating the extent to which the stator current deviates from the current command, based on the current command and the stator current, reference value production means for producing a reference value data of the saturation degree, gain production means for producing a gain data indicating the rate at which the current command is changed, current command production means for producing the current command data based on the saturation degree, the reference value and the gain, steady state judging means for judging whether the motor is in steady state, and vibration amplitude calculation means for calculating the vibration amplitude indicating the degree of vibration based on the vibration of at least one of the current command, the saturation degree, the stator current, the motor rotational speed and the motor output torque, wherein the gain production means produces the gain data based on the vibration amplitude in the steady state.

According to another aspect of the invention, there is provided a motor controller comprising drive means for supplying power to the stator windings of a motor in response to a current command, stator current detection means for detecting the stator current flowing in the stator windings, saturation degree production means for producing the saturation degree data indicating the extent to which the stator current deviates from the current command, based on the current command and the stator current, reference value production means for producing a reference value of the saturation degree, gain production means for producing a gain data indicating the rate at which the current command is changed, and current command production means for producing the current command data based on the saturation degree, the reference value and the gain, wherein the reference value production means produces a reference value based on at least one of the motor rotational speed, the current command and the drive voltage applied to the drive means.

According to another aspect of the invention, there is provided a motor controller comprising drive means for supplying power to the stator windings of a motor in response to a current command, stator current detection means for detecting the stator current flowing in the stator windings, saturation degree production means for producing the saturation degree data indicating the extent to which the stator current deviates from the current command, based on the current command and the stator current, reference value production means for producing a reference value data of the saturation degree, gain production means for producing a gain data indicating the rate at which the current command is changed, current command production means for producing the current command data based on the saturation degree, the reference value and the gain, preparation period signal production means for producing a preparation period signal indicating that a preparation period for determining the reference value is prevailing, and determination timing signal production means for producing a determination timing signal indicating the timing of determining the reference value, wherein the current command production means maintains the current command at a constant value when the preparation period signal is being generated, and produces the reference value data based on the saturation degree when the determination timing signal is produced.

According to another aspect of the invention, there is provided a motor controller comprising drive means for supplying power to the stator windings of a motor in response to a current command, stator current detection means for detecting the stator current flowing in the stator windings, saturation degree production means for producing the saturation degree data indicating the extent to which the stator current deviates from the current command, based on the current command and the stator current, reference value production means for producing a reference value of the saturation degree, gain production means for producing a gain data indicating the rate at which the current command is changed, current command production means for producing the current command data based on the saturation degree, the reference value and the gain, and condition judging means for producing a condition index data indicating the operating mode of the motor, wherein the gain production means produces the gain data based on the condition index.

According to another aspect of the invention, there is provided a motor controller comprising drive means for supplying power to the stator windings of a motor in response to a current command, stator current detection means for detecting the stator current flowing in the stator windings, saturation degree production means for producing the saturation degree data indicating the extent to which the stator current deviates from the current command, based on the current command and the stator current, reference value production means for producing a reference value data of the saturation degree, gain production means for producing a gain data indicating the rate at which the current command is changed, current command production means for producing the current command data based on the saturation degree, the reference value and the gain, and condition judging means for producing a condition index indicating the operating condition of the motor, wherein the reference value production means produces the reference value based on the condition index.

According to another aspect of the invention, there is provided a motor controller comprising drive means for supplying power to the stator windings of a motor in response to a current command and current command production means for producing the current command, wherein the current command production means produces a q-axis current command data and a d-axis current command data, the system further comprising q-axis current command correction means for producing a q-axis current correction amount based on at least one of the motor rotational speed and the current command and correcting the q-axis current command by an amount equivalent to the q-axis current correction amount.

According to another aspect of the invention, there is provided a motor controller comprising drive means for supplying power to the stator windings of a motor in response to a current command, and current command production means for producing the current command data, wherein the amount of magnetic fluxes generated is controlled by changing the current phase of the current command, wherein the current command production means produces a q-axis current command data and a d-axis current command data, and wherein the current phase of the current command is changed in such a manner as to maintain the product of the q-axis current command and the d-axis current command at a constant level.

According to another aspect of the invention, there is provided a motor controller comprising drive means for supplying power to the stator windings of a motor in response to a current command, current command production means for producing the current command data, and phase compensation amount calculation means for calculating a phase compensation amount indicating the phase delay of the stator current flowing in the stator windings relative to the current command, wherein the phase compensation amount calculation means increases the phase compensation amount when the motor rotational speed increases, wherein the current command production means produces a q-axis current command data and a d-axis current command data, and wherein the q-axis current is compensated for based on the product of the phase compensation amount and the d-axis current command while the d-axis current is compensated for based on the product of the phase compensation amount and the q-axis current command.

As described above, according to the present invention, in the high-efficiency field-weakening control of a motor used for electric vehicles, an output torque without vibration is realized, the output torque is not increased relative to the rotational speed, the output torque is changed upward or downward in agreement with the change in the actuation angle of the accelerator pedal, and the output torque is reduced to zero when the vehicle is coasting. In this way, an advantageous effect is obtained of realizing a motor controller in which a stable output torque is generated in a wide rotational speed range regardless of the variations in setting, secular variations or environmental changes.

DETAILED DESCRIPTION OF THE INVENTION

Now, embodiments of the present invention will be described with reference to FIG. 1 to FIG. 22.

First Embodiment

[General configuration]

Figure 1:
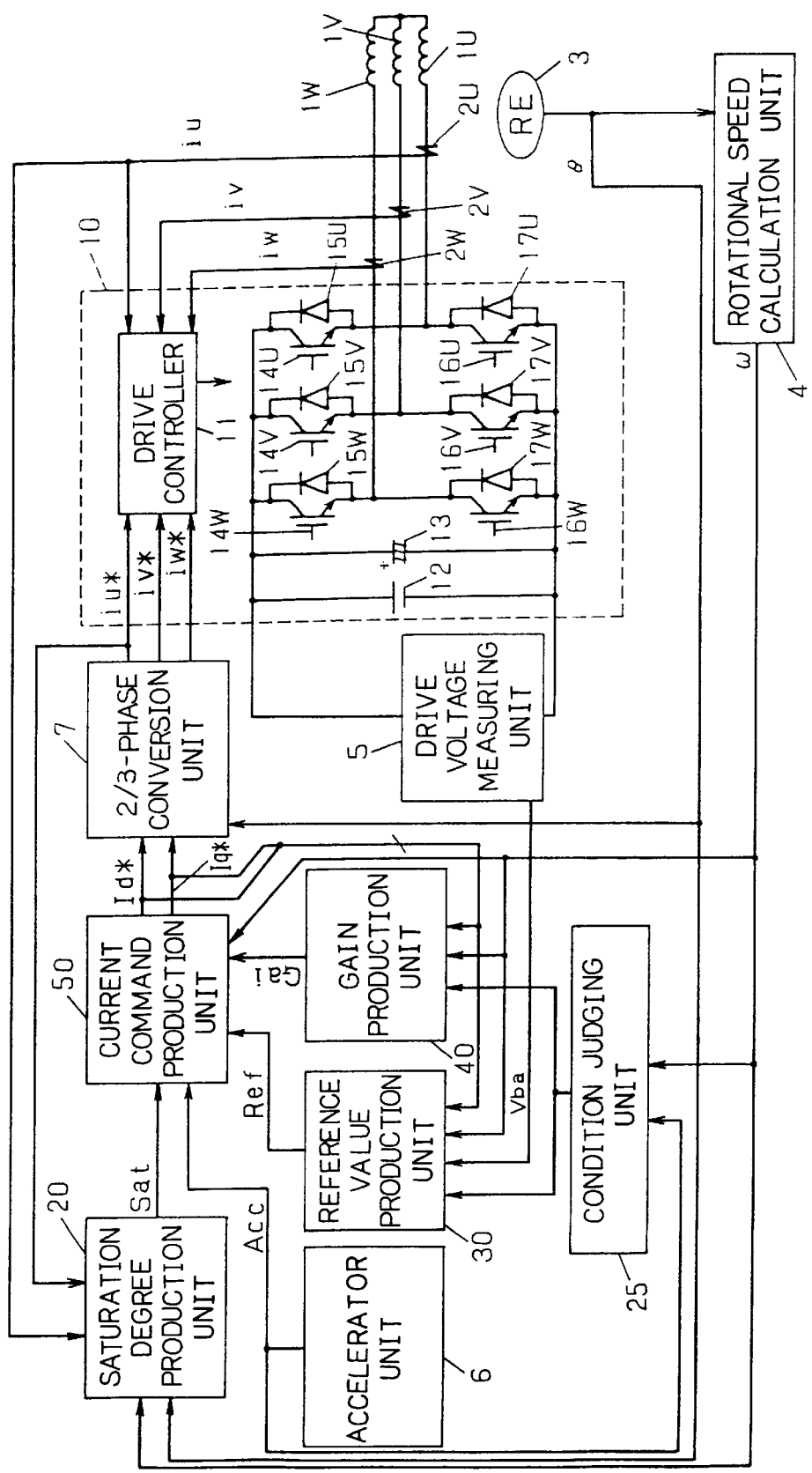
FIG. 1 is a block diagram of a motor controller according to a first embodiment.

FIG. 1 is a block diagram of a motor controller according to a first embodiment. Stator windings 1U, 1V, 1W of a brushless motor are connected to a drive unit 10. Current detection units 2U, 2V, 2W are for detecting the stator currents iu, iv, iw, respectively, flowing in the stator windings 1U, 1V, 1W, and apply the detected currents to a drive controller 11 in the drive unit 10 and a saturation degree production unit 20. A rotary encoder 3 detects the rotational position θ of the rotor of a brushless motor, and applies the detected value to the rotational speed calculation unit 4, a 2/3-phase conversion unit 7 and the saturation degree production unit 20. The rotational speed calculation unit 4 calculates the rotational speed ω based on the rotational position θ, and applies the calculated speed value to the saturation degree production unit 20, a condition judging unit 25, a reference value production unit 30, a gain production unit 40 and a current command production unit 50. A drive voltage measuring unit 5 is for measuring the voltage across a power supply 12 in the drive unit 10 as a drive voltage Vba and applies the measurement to the reference value production unit 30. An accelerator unit 6 applies an accelerator value Acc to the condition judging unit 25 and the current command production unit 50.

The saturation degree production unit 20 produces a saturation degree Sat based on the rotational position θ, the rotational speed ω, a stator current command iu* and the stator current iu, and applies the saturation degree Sat to the current command production unit 50. The condition judging unit 25 produces a condition index Fcond based on the rotational speed ω and the accelerator value Acc, and applies the result to the reference value production unit 30 and the gain production unit 40. The reference value production unit 30 produces a reference value Ref based on the rotational speed ω, the source voltage Vba, the condition index Fcond and the current commands Id*, Iq*, and applies the result to the current command production unit 50. A gain production unit 40 produces a gain Gai based on the rotational speed ω, the condition index Fcond and the current commands Id*, Iq*, and applies the result to the current command production unit 50. The current command production unit 50 produces a d-axis current command Id* and a q-axis current command Iq* based on the rotational speed ω, the accelerator value Acc, the saturation degree Sat, the reference value Ref and the gain Gai, and applies the result to the 2/3-phase conversion unit 7, the reference value production unit 30 and the gain production unit 40. The 2/3-phase conversion unit 7 produces stator current commands iu*, iv*, iw* based on the rotational position θ and the current commands Id*, Iq*, and applies the result to the drive controller 11 in the drive unit 10.

The drive unit 10 supplies power to the stator windings 1U, 1V, 1W based on the stator current commands iu*, iv*, iw* and the stator currents iu, iv, iw. The drive controller 11 in the drive unit 10 controls the gate voltages of the upper IGBTs 14U, 14V, 14W and the lower IGBTs 16U, 16V, 16W based on the stator current commands iu*, iv*, iw* and the stator currents iu, iv, iw. The positive electrode of the power supply 12 is connected to the collectors of the upper IGBTs 14U, 14V, 14W, and the negative electrode of the power supply 12 is connected to the emitters of the lower IGBTs 16U, 16V, 16W. An electrolytic capacitor 13 is connected in parallel to the power supply 12. The emitters of the upper IGBTs 14U, 14V, 14W are connected to the collectors of the lower IGBTs 16U, 16V, 16W, respectively, and further to the stator windings 1U, 1V, 1W, respectively. Upper diodes 15U, 15V, 15W are connected in inverse parallel manner across the collectors and emitters of the upper IBGTs 14U, 14V, 14W, respectively. Lower diodes 17U, 17V, 17W are connected in inverse parallel manner across the collectors and emitters of the lower IGBTs 16U, 16V, 16W, respectively.

[General operation]

The rotational speed calculation unit 4 samples the rotational angle θ [degree] at sampling intervals ΔT [sec], and produces the rotational speed ω [r/min] from equation 4, where the rotational angle θ is expressed by a mechanical angle.

$$\omega[\text{r/min}] = \frac{1}{6} \frac{\theta(i)[\text{degree}] - \theta(i-1)[\text{degree}]}{\Delta T[\text{sec}]} \quad (4)$$

The accelerator unit 6 produces accelerator value Acc based on the actuation angle of the accelerator pedal, the actuation angle of the brake, the rotational speed and the shift position. The shift positions (not shown) include forward, rearward, parking and neutral. When the brake is not applied, the accelerator value Acc increases in proportion to the accelerator pedal actuation angle. Assume that the sign is positive to define a dynamic mode. With the increase in the accelerator pedal actuation angle, the accelerator value is increased, so that the motor increases a positive output torque. When the accelerator pedal is not actuated, on the other hand, the absolute value of the accelerator value Acc is increased in proportion to the brake actuation angle. Assume that the sign is negative to define a regeneration mode. With the increase in the brake actuation angle, the accelerator value is reduced (the absolute accelerator value is increased), so that the motor reduces the negative output torque (increases the absolute value of the negative output torque). Further, when the shift position is neutral, the accelerator value Acc is reduced to zero to define a coasting mode, thereby reducing the output torque to zero, as described later. In other than the above-mentioned cases, for example, when the shift position is forward or rearward with neither the accelerator pedal nor the brake pedal actuated. In such a case, the output torque can be reduced to zero in coasting mode, or a slight negative accelerator value can be output for producing a negative regenerative torque, thus performing a function equivalent to the engine brake for the internal combustion engine. Any one of these choices can be appropriately determined by the user of the motor controller. As another alternative configuration, a coasting mode can be defined when the rotational speed is low, and a regeneration mode can be defined when the rotational speed increases.

The saturation degree production unit 20, as seen from equation 5, integrates the absolute value |iu*−iu| of the difference (current error) between the stator current command iu* and the stator current iu for one period, multiplies the integration by the rotational speed ω of the brushless motor, and determines the resulting product as a saturation degree Sat. In this equation, t is an arbitrary time, and T is the period of the stator current command iu*.

$$Sat = \omega \cdot \int_{t}^{t+T} |iu^* - iu| dt \qquad (5)$$

The integration period is determined from the rotational position θ. The rotational position θ is represented by a mechanical angle, while one period of the current error is equivalent to one period in electrical angle. Therefore, the time length determined by dividing one period of the rotational position θ by the number of pole pairs represents one period of the current error (iu*−iu). Specifically, in the case where the brushless motor has 2p poles, the integration period is set to 0 [degree] to 360/p [degree], 360/p [degree] to 2·360/p [degree], . . . , (p−1)·360/p [degree] to 360 [degree]. The integration period, which is started from 0 [degree] in the above consideration, can be started from a different angle. Also, although the period of the current error (iu*−iu) is one period of electrical angle, the period of the absolute value (|iu*−iu|) of the current error is a half period in electrical angle. Therefore, the integration period can be a half period in electrical angle. In the case where the current error (iu*−iu) has an offset, however, the accuracy of the integrated value is deteriorated. Further, the integration period can be a multiple of the period in electrical angle. In such a case, however, the integration period increases to such an extent that it takes a longer time to produce the saturation degree Sat for a deteriorated response of the field-weakening control. If the integration period is set to one period in mechanical angle, on the other hand, it is possible to remove the effect of magnetization irregularities of the rotor of the brushless motor at the sacrifice of a longer integration period. When the rotational speed ω is small, the integration time can be set to one period in electrical angle, for example, while when the rotational speed ω is high, the integration time is set to one period in mechanical angle. In this way, with the increase in the rotational speed ω, the number of periods occupied by the integration time can be increased. Further, although the integration starting time t is determined arbitrarily, it can be determined at or in the neighborhood of a point associated with a minimum value of the absolute current error |iu*−iu|. Then, in the case where the integrating operation is so configured that it takes a long time to reset the result of integration, the effect of resetting is reduced thereby to realize a highly accurate integration result.

Since the integration period is inversely proportional to the rotational speed ω, the integrated value of the absolute current error varies with the rotational speed ω for the same current error. In view of this, the product of the rotational speed ω and the integrated value of the absolute current error |iu*−iu| is used as the saturation degree Sat.

The condition judging unit 25 monitors the rotational speed ω and the accelerator value Acc. Thus, when the operating condition changes in such a direction as to increase the output, the condition index Fcond is set to 1; when the operating condition changes in such a direction as to reduce the output, the condition index Fcond is set to −1; and in other cases, the condition index Fcond is set to 0. Specifically, in the case where the rate of increase of the rotational speed ω is not less than a preset value, or in the case where the rate of increase of the accelerator value Acc is not less than a preset value, the condition index Fcond is set to 1. In the case where the rate of decrease of the rotational speed ω is not less than a preset value or in the case where the rate of decrease of the accelerator value Acc is not less than a preset value, then the condition index Fcond is set to −1. Also, in the case where the direction in which the output changes is not known such as when the accelerator value Acc is decreasing while the rotational speed ω is on the increase, the condition index Fcond is set to zero.

The reference value production unit 30 produces the reference value Ref by a method described later. The gain production unit 40 produces the gain Gai by a method described later.

Figure 2:
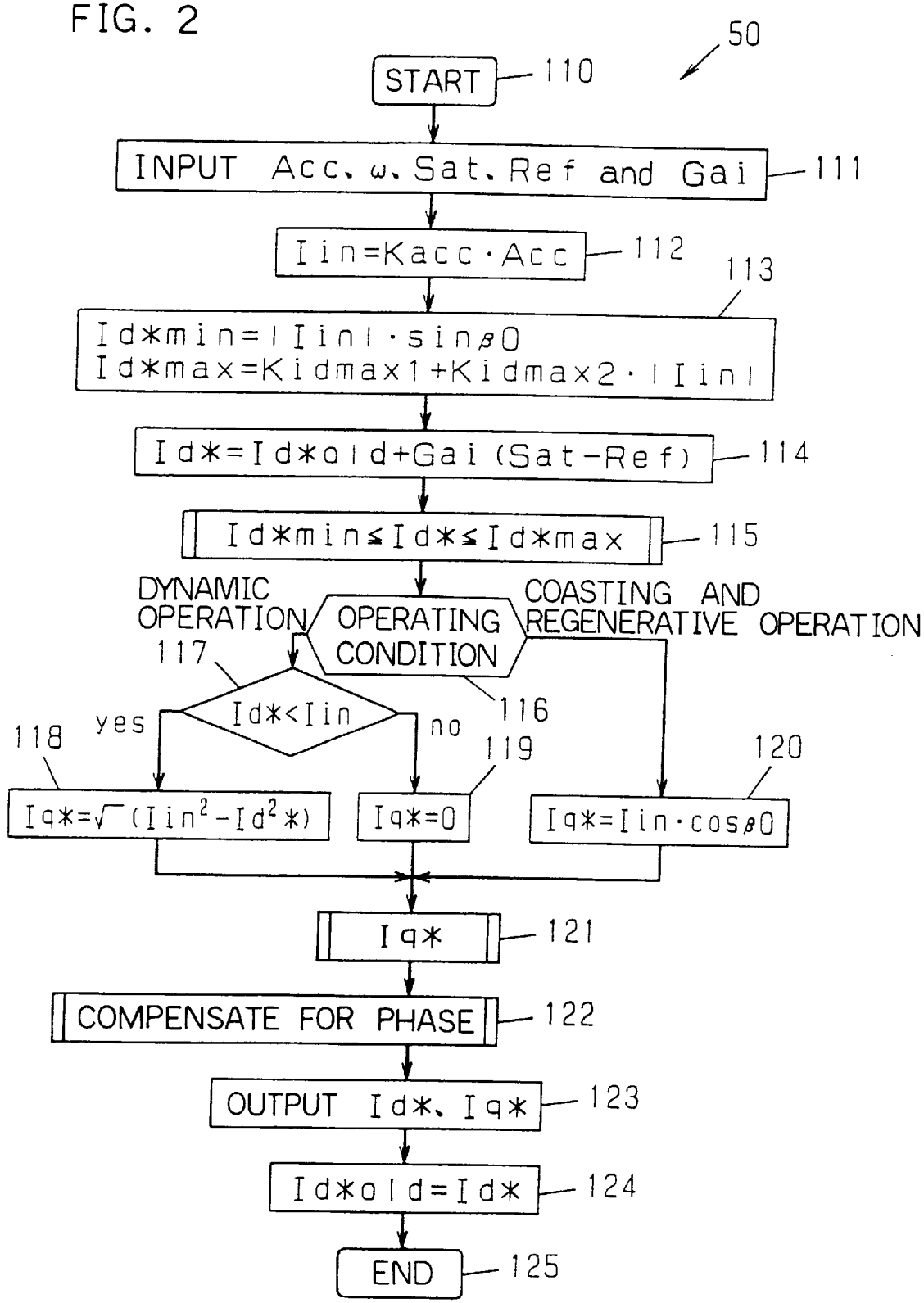
FIG. 2 is a flowchart showing the operation of the current command production unit according to the first embodiment.

Now, the operation of the current command production unit 50 will be described. FIG. 2 is a flowchart showing the operation of the current command production unit according to the first embodiment. A detailed explanation follows.

Step 110 starts production of a current command. Step 111 inputs the accelerator value Acc, the rotational speed ω, the saturation degree Sat, the reference value Ref and the gain Gai.

Step 112 produces a current index Iin. As seen from equation 6, the product of a preset constant Kacc and the accelerator value Acc is used as a current index Iin. The constant Kacc is set in such a manner that when the absolute accelerator value Acc is maximum, the absolute value of the current index Iin assumes a maximum absolute value of the current command in the operation-on-current-index-circumference mode described later. Also, the maximum value of the current command in the operation-on-current-index-circumference mode is set based on the maximum value of the torque output or the maximum tolerable current of IGBT.

$$Iin = Kacc \cdot Acc \qquad (6)$$

Step 113 produces a minimum value Id*min of the d-axis current command Id* and a maximum value Id*max of the d-axis current command. As seen from equation 7, the product of the absolute value |Iin| of the current index and sin β0 is defined as the minimum value Id*min, where β0 is the current phase β associated with the maximum value of the output torque Trq of the brushless motor, as seen from FIG. 21, and assumes 0° for the SPM motor and a value between 0° and 45° for the IPM motor. On the other hand, the product of a preset constant Kidmax2 and the absolute value |Iin| of the current index plus a preset constant Kidmax1 is defined as a maximum value Id*max.

$$\begin{cases} Id^*min = |Iin| \cdot \sin\beta 0 \\ Id^*max = Kidmax1 + Kidmax2 \cdot |Iin| \end{cases} \quad (7)$$

Step 114 produces the d-axis current command Id*. As seen from equation 8, the saturation degree Sat less the reference value Ref is multiplied by the gain Gai, plus the previous value Id*old of the d-axis current command, is defined as a d-axis current command Id*. The previous value of the d-axis current command is held as the previous value Id*old.

$$Id^* = Id^*o \int d + Gai \cdot (Sat - Ref) \quad (8)$$

Step 115 limits the d-axis current command Id*. In the case where the d-axis current command Id* is smaller than the minimum value Id*min (Id*<Id*min), the d-axis current command Id* is changed to the minimum value Id*min (Id*=Id*min). In the case where the d-axis current command Id* is larger than the maximum value Id*max (Id*>Id*max), on the other hand, the d-axis current command Id* is changed to the maximum value Id*max (Id*=Id*max).

Step 116 branches to dynamic mode or coasting/regeneration mode depending on the prevailing operating condition. The sign of the current index Iin is coincident with that of the accelerator value Acc. Therefore, the dynamic mode is involved when the current index Iin positive, the coasting mode is involved when it is zero, and the regenerate mode is involved when it is negative. In the case where the current index Iin is positive, therefore, step 117 is executed in dynamic mode. When the current index Iin is 0 or negative, on the other hand, the coasting/regeneration mode is entered and step 120 is executed.

Step 117 branches to the operation-on-current index-circumference mode or the operation-on-d-axis mode depending on the magnitude of the d-axis current command Id*. In the case where the d-axis current command Id* is smaller than the current index (Id*<Iin), the operation-on-current-index-circumference mode is entered, and step 118 is executed. In the case where the d-axis current command Id* is not less than the current command (Id*≧Iin), on the other hand, the operation-on-d-axis mode is entered, and step 119 is executed.

Step 118 produces the q-axis current command Iq* (dynamic mode, operation-on-current-index-circumference mode). The square root of subtraction result of the square of the current index Iin less the square of the d-axis current command Id* is defined as a q-axis current command Iq*.

Step 119 produces the q-axis current command Iq* (dynamic mode, operation-on-d-axis mode). The q-axis current command Iq* is set to 0.

Step 120 produces the q-axis current command Iq* (coasting/regeneration mode). The product of the current index Iin and cos β0 is defined as a q-axis current command Iq*.

Step 121 corrects the q-axis current command (Iq* correction) by a method described later. Step 122 compensates for the phase of the current command by a method described later.

Step 123 outputs the d-axis current command Id* and the q-axis current command Iq*.

Step 124 holds the d-axis current command Id*. In order to use the d-axis current command Id* for the next step, the d-axis current command Id* is set to a new previous value Id*old. Id*old is set to 0 as an initial value.

The production of the current command is completed in step 125.

Figure 3:
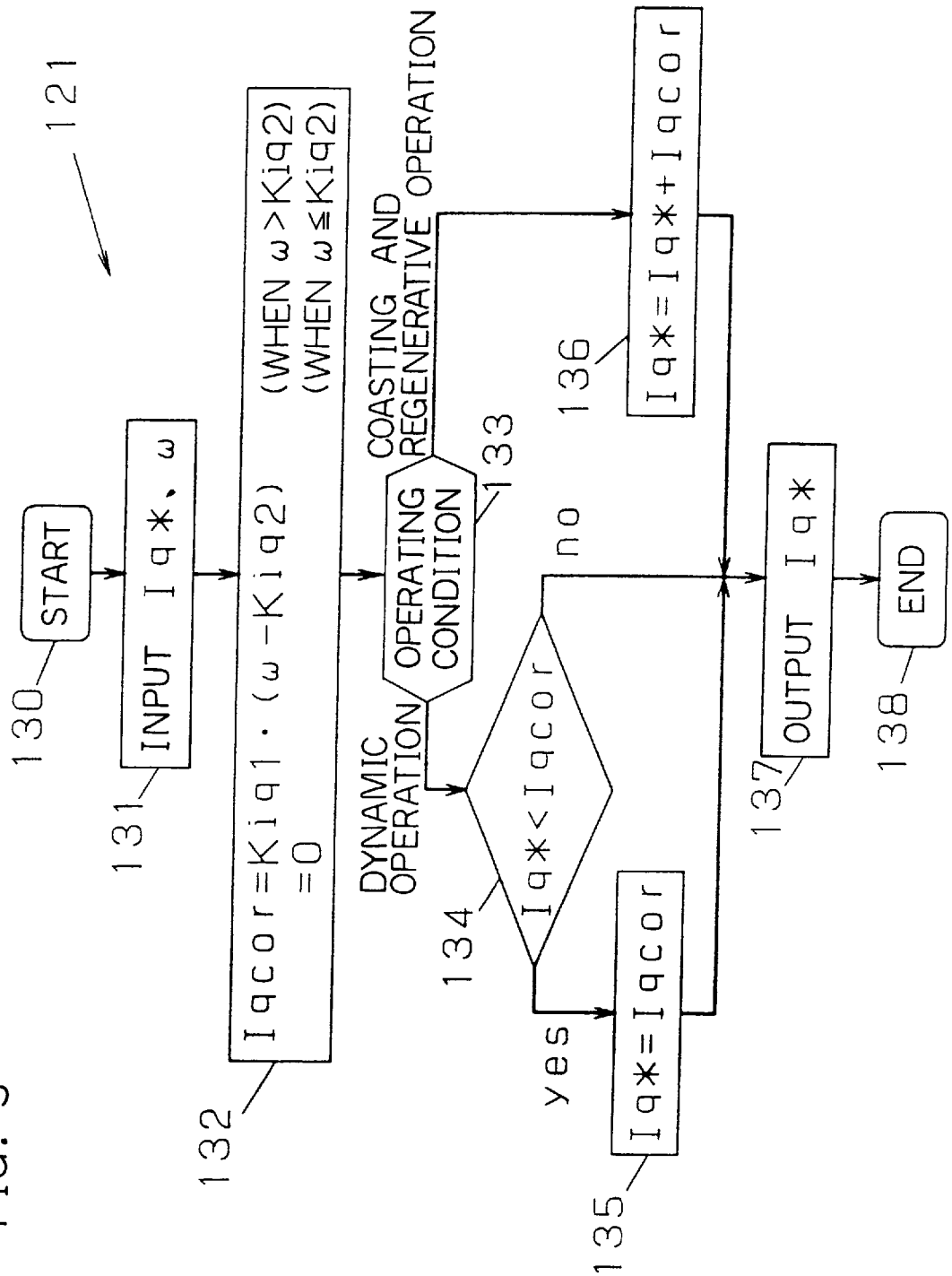
FIG. 3 is a flowchart showing the operation of correcting the q-axis current command according to the first embodiment.

Now, explanation will be made about a method of correcting the q-axis current command (Iq* correction) in step 121. FIG. 3 is a flowchart showing the operation of correcting the q-axis current command according to the first embodiment. A detailed explanation follows.

Step 130 starts the correction of the q-axis current command.

Step 131 inputs the q-axis current command Iq* and the rotational speed ω.

Step 132 produces a q-axis current correction amount Iqcor. As seen from equation 9, in the case where the rotational speed ω is higher than a preset constant Kiq2, the difference between the rotational speed ω and the constant Kiq2 multiplied by a preset constant Kiq1 is defined as a q-axis correction amount Iqcor. Also, when the rotational speed ω is not more than the constant Kiq2, the q-axis current correction amount Iqcor is set to 0.

$$Iqcor = \begin{cases} Kiq1 \cdot (\omega - Kiq2) & (\omega > Kiq2) \\ 0 & (\omega \leq Kiq2) \end{cases} \quad (9)$$

Step 133 branches to dynamic mode or coasting/regeneration mode depending on the prevailing operating condition. The sign of the q-axis current index Iq* is coincident with that of the current index Iin. Therefore, the dynamic mode is involved when the q-axis current index Iq* is positive, and the regenerate mode is involved when it is negative. When the sign of the q-axis current index Iq* is 0, on the other hand, either the operation-on-d-axis mode for powering (dynamic mode) or the coasting mode is involved. Whichever mode step 133 branches to, the corrected q-axis current command Iq* remains the same. For the sake of convenience, therefore, both modes are collectively defined as a coasting mode without any problem. When the q-axis current command Iq* is positive, therefore, the dynamic mode is entered and step 134 is executed. When the q-axis current command Iq* is 0 or negative, on the other hand, the coasting/regeneration mode is entered and step 136 is executed.

Step 134 branches to the q-axis current correction mode or the q-axis current non-correction mode depending on the magnitude of the q-axis current command Iq*. In the case where the q-axis current command Iq* is smaller than the q-axis current correction amount Iqcor (Iq*<Iqcor), the q-axis current correction mode is assumed and step 135 is executed. In the case where the q-axis current command Iq* is not less than the q-axis current correction amount (Iq*≧Iqcor), on the other hand, the q-axis current non-correction mode is assumed and the q-axis current command Iq* is not corrected, but step 137 is executed.

Step 135 corrects the q-axis current command Iq* (dynamic mode, q-axis current correction mode). The q-axis current correction amount Iqcor is defined as the q-axis current command Iq*.

Step 136 corrects the q-axis current command Iq* (coasting/regeneration mode). The q-axis current command Iq* plus the q-axis current correction amount Iqcor is defined as a new q-axis current command Iq*.

Step 137 outputs the q-axis current command Iq*. Step 138 terminates the correction of the q-axis current command.

According to this embodiment, the q-axis current command correction is executed independently. The process for branching from the dynamic mode or the coasting/regeneration mode depending on the operating condition, therefore, appears in both steps 116 and 133. The two steps can be unified, however, by dividing the operation of correcting the q-axis current command and incorporating it into the operation of producing the current command.

Figure 4:
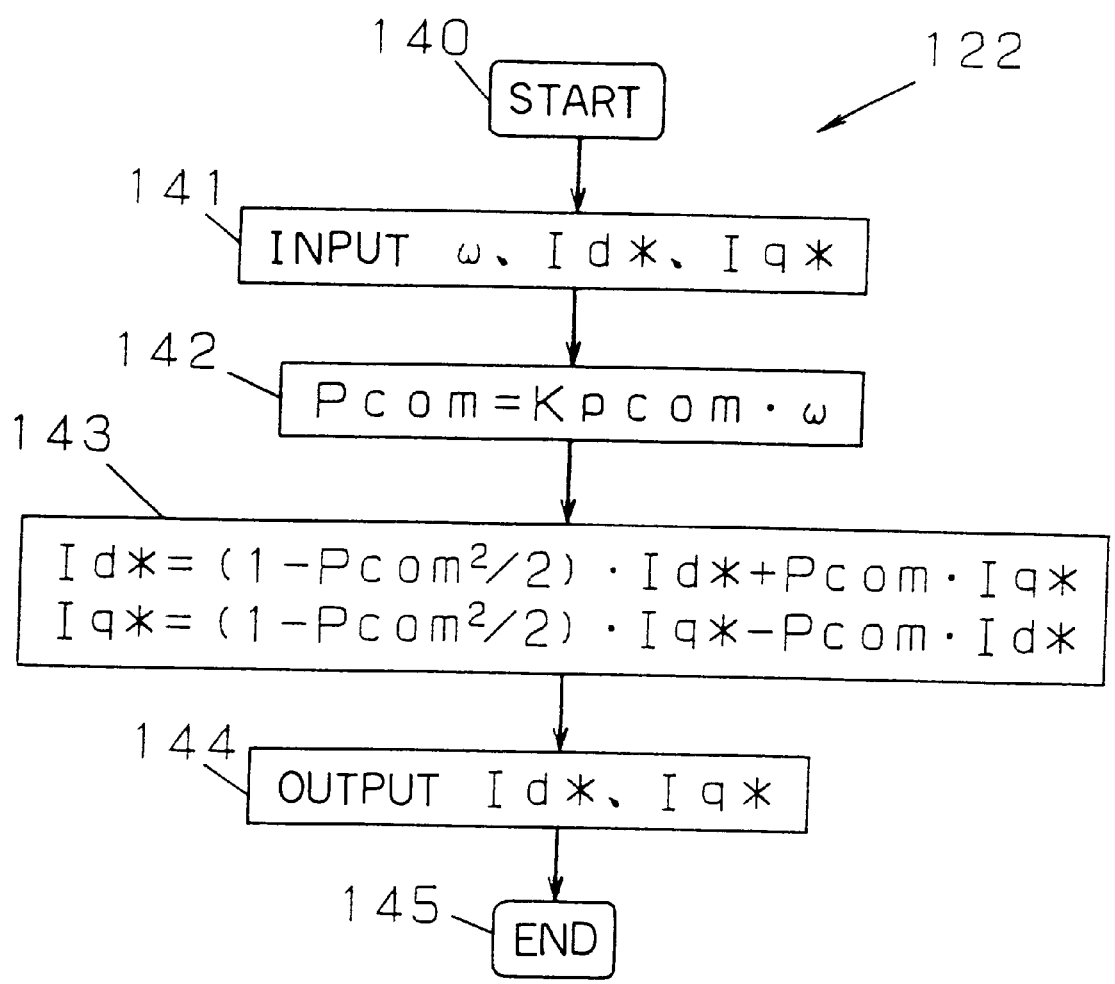
FIG. 4 is a flowchart showing the operation of phase compensation according to the first embodiment.

Now, a method of phase compensation in step 122 will be explained. FIG. 4 is a flowchart showing the phase compensation operation according to the first embodiment. A detailed explanation follows.

Step 140 starts phase compensation.

Step 141 in puts the rotational speed ω, the d-axis current command Id* and the q-axis current command Iq*.

Step 142 produces a phase compensation amount Pcom. As seen from equation 10, the product of a preset constant Kpcom and the rotational speed ω is defined as a phase compensation amount Pcom. Pcom is expressed in radians.

$$Pcom = Kpcom \cdot \omega \qquad (10)$$

Step 143 compensates for the phase. As seen from equation 11, the phase compensation is performed based on the phase compensation amount Pcom, the d-axis current command Id* and the q-axis current command Iq*.

$$\begin{cases} Id^* = \left(1 - \dfrac{Pcom^2}{2}\right) \cdot Id^* + Pcom \cdot Iq^* \\ Iq^* = \left(1 - \dfrac{Pcom^2}{2}\right) \cdot Iq^* - Pcom \cdot Id^* \end{cases} \qquad (11)$$

Step 144 outputs the d-axis current command Id* and the q-axis current command Iq*.

Step 145 terminates the phase compensation.

The 2/3-phase conversion unit 7, as seen from equation 12, converts the d-axis current command Id* and the q-axis current command Iq* on the two-phase rotary coordinates into stator current commands iu*, iv*, iw* on the three-phase static coordinates, where θe is an electrical rotational angle converted appropriately from the rotational angle θ. Also, the period in electrical rotational angle θe is 1/p times larger than the period in rotational angle θ (in the case where the rotor of the brushless motor has 2P magnetic poles).

$$\begin{pmatrix} iu^* \\ iv^* \\ iw^* \end{pmatrix} = \sqrt{\dfrac{2}{3}} \begin{pmatrix} 1 & 0 \\ -\dfrac{1}{2} & \dfrac{\sqrt{3}}{2} \\ -\dfrac{1}{2} & -\dfrac{\sqrt{3}}{2} \end{pmatrix} \begin{pmatrix} \cos\theta e & \sin\theta e \\ -\sin\theta e & \cos\theta e \end{pmatrix} \begin{pmatrix} Id^* \\ Iq^* \end{pmatrix} \qquad (12)$$

The drive unit 10 supplies currents expressed by the stator current commands iu*, iv*, iw* to the stator windings 1U, 1V, 1W, respectively. A detailed explanation follows.

Power is applied from the source voltage 12 to the drive unit 10, and the electrolytic capacitor 13 smooths the source voltage 12.

Figure 5:
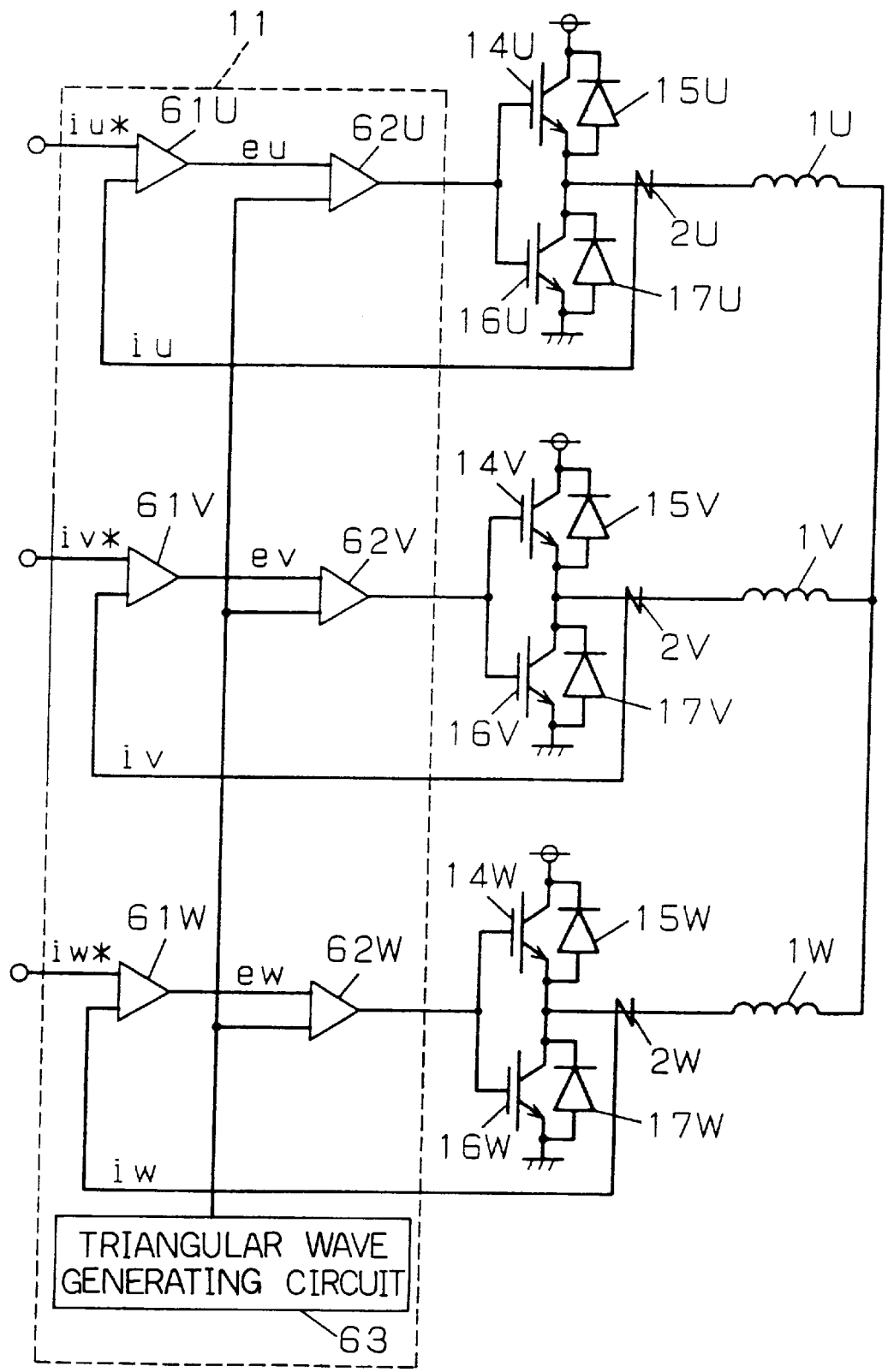
FIG. 5 is a diagram showing a circuit configuration of a drive controller according to the first embodiment.

FIG. 5 is a diagram showing a circuit configuration of a drive controller according to the first embodiment. The drive controller 11 includes differential amplifiers 61U, 61V, 61W, comparators 62U, 62V, 62W and a triangular wave generating circuit 63. The differential amplifiers 61U, 61V, 61W, as seen from equation 13, subtract the stator currents iu, iv, iw from the stator current commands iu*, iv*, iw*, respectively, multiply the difference by a current minor gain Ke which is a constant, and thus produce PWM current errors eu, ev, ew, respectively. In equation 13, only the proportional operation is performed. Alternatively, the proportional/integral operation or the proportional/integral/differential operation can be performed. The triangular wave generating circuit generates a triangular wave (several kHz to several tens of kHz). The comparator 62U compares the PWM current error eu with the triangular wave. When the PWM current error eu is larger, the upper IGBT 14U is made conductive and the lower IGBT 16U is made nonconductive, while when the PWM current error eu is smaller, on the other hand, the upper IGBT 14U is made nonconductive and the lower IGBT 16U is made conductive. At the time of transition of the conductive states of the upper IGBT 14U and the lower IGBT 16U, both the upper IGBT 14U and the lower IGBT 16U are made nonconductive and a short length of time (dead time) is inserted for preventing the shorting of the drive power supply 12. A similar operation is performed for the remaining two phases.

$$\begin{cases} eu = Ke \cdot (iu^* - iu) \\ ev = Ke \cdot (iv^* - iv) \\ ew = Ke \cdot (iw^* - iw) \end{cases} \qquad (13)$$

[Field-weakening control using saturation degree]

Figure 6:
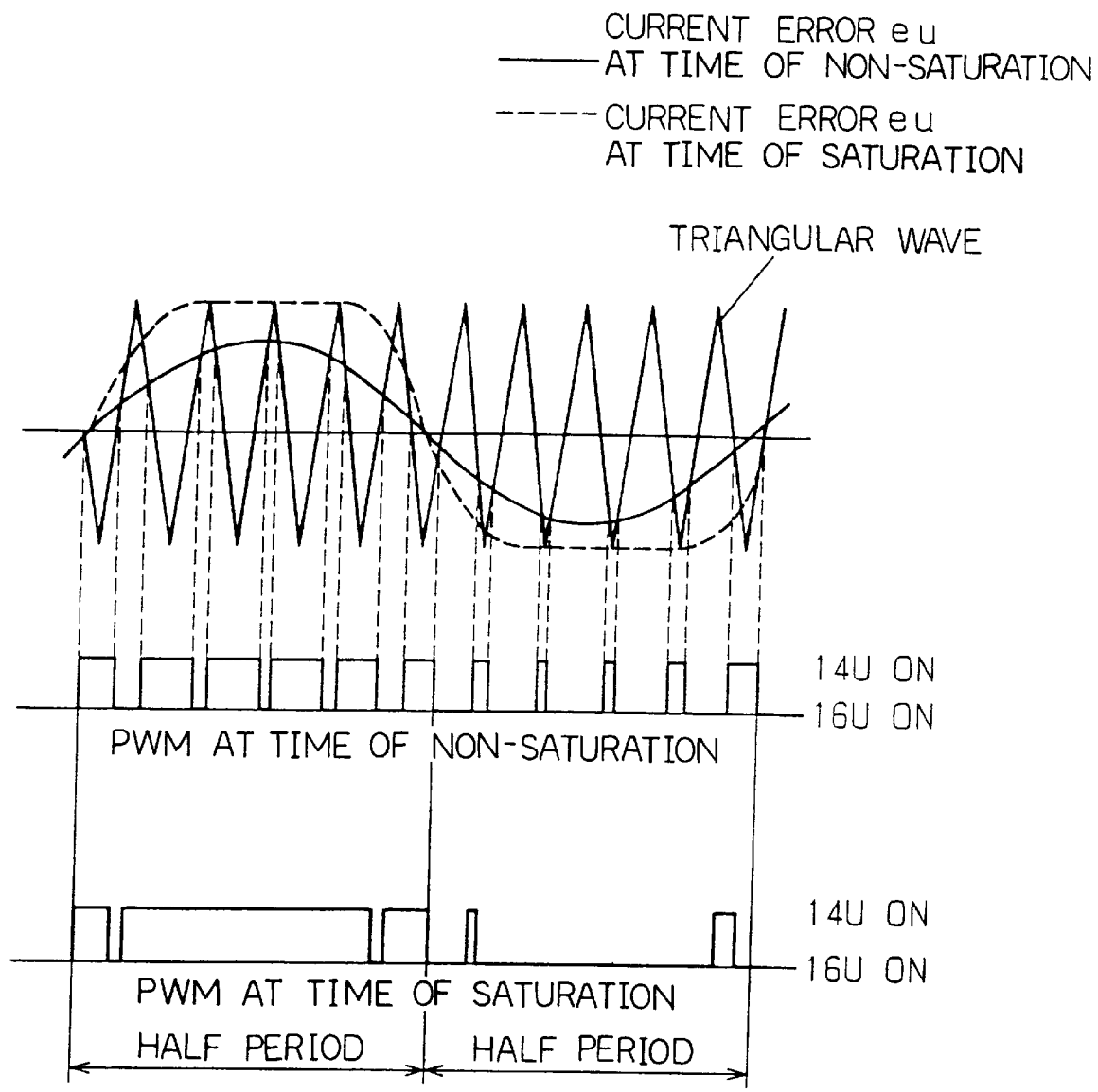
FIG. 6 is a waveform diagram showing PWM signals at the time of saturation and at the time of non-saturation.

FIG. 6 shows waveforms of the PWM signal at the time of saturation and at the time of non-saturation. The waveforms include the triangular wave, and waves representing the PWM current error eu, the operation of the upper IGBT 14U and the operation of the lower IGBT 16U. FIG. 6 does not include the dead-time. FIG. 7 show waveforms of the stator current command and the stator current at the time of saturation and non-saturation. Both the stator current command iu* and the stator current iu are shown.

Figure 7A:
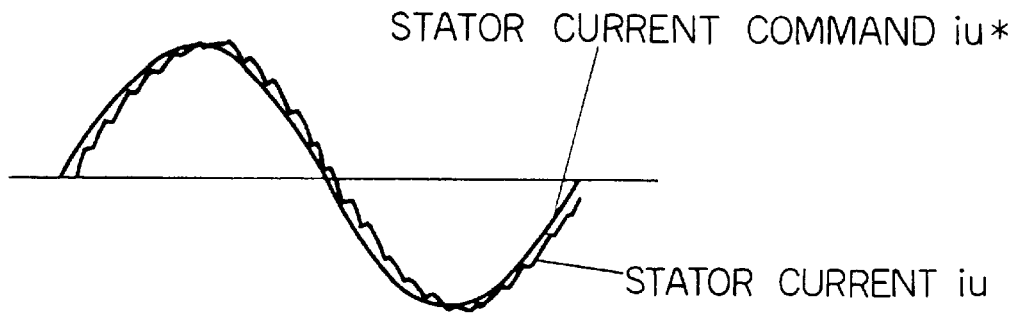
FIG. 7A is a waveform diagram showing the stator current command and the stator current at the time of non-saturation.
Figure 7B:
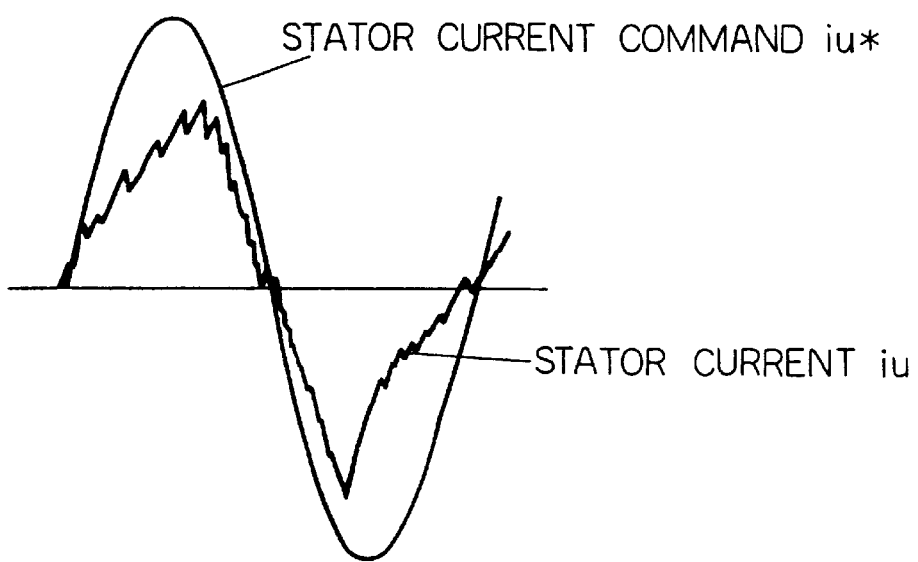
FIG. 7B is a waveform diagram showing the stator current command and the stator current at the time of saturation.

At the time of non-saturation, the amplitude of the PWM current error eu is smaller than that of the triangular wave, and thus the source voltage has a margin. Under this condition, as seen from FIG. 7A, the stator current iu flows according to the stator current command iu*. At the time of saturation, on the other hand, the amplitude of the PWM current error eu is larger than that of the triangular wave, and thus a voltage fails to have a margin so that the upper IGBT 14U or the lower IGBT 16U is undesirably made conductive partially. As shown in FIG. 7B, therefore, the stator current iu fails to flow in response to the stator current command iu*.

In other words, the voltage has a margin and the current error is small at the time of non-saturation, while the voltage has no margin and the current error is large at the time of saturation. Also, as described in [Field-weakening control] according to the prior art, an increase in the d-axis current Id increases the voltage margin, while a reduced d-axis current Id reduces the voltage margin.

In view of this, a value indicating the magnitude of the current error is used as the saturation degree Sat, which is changed upward or downward to change the d-axis current Id upward or downward, thereby controlling the voltage margin. Due to the characteristic unique to the PWM control, a current error presents itself as shown in FIG. 7A even when the voltage has a margin. For this reason, the saturation degree Sat involved is used as a reference value Ref. A voltage is judged to have no margin and the d-axis current is increased, when the saturation degree Sat is larger than the reference value Ref (Sat>Ref), on the other hand, a voltage is judged to have a sufficient margin and the d-axis current is decreased, when the saturation degree Sat is smaller than the reference value Ref (Sat<Ref). The saturation degree Sat is equalized to the reference value Ref by this feedback control. The copper-loss can thus be minimized by supplying a required minimum amount of the d-axis current Id.

Step 114 (FIG. 2) performs the above-mentioned operation in the current command production unit 50. Thus an optimum Id is realized and a field-weakening control can be executed with high efficiency.

As described above, the saturation degree Sat can be represented by any other parameter which indicates the magnitude of the current error. Consequently, the saturation degree Sat is not limited to the product of the integrated value of the absolute current error (|iu*−iu|) and the rotational speed as in this embodiment (equation 5). Alternatively, it is possible to use the current error of other phases, an average value of the integrated values for two or more phases, the total sum of the squares of the current errors of the three phases, or the absolute value or the square of the current error passed through a low-pass filter (LPF). As another alternative, the stator currents iu, iv, iw are 2/3-phase-converted, the d-axis current Id and the q-axis current Iq are determined, and the saturation degree Sat can be produced based on the result of comparison between the d-axis current command Id* and the q-axis current command Iq*. It is thus possible to use, for example, an error (the proportion of the error of the q-axis current: Iq*−Iq) between the q-axis current command Iq* and the q-axis current Iq, an integration of the error (the integration of the error of the q-axis current $\int(iq^*-iq)dt$) between the q-axis current command Iq* and the q-axis current Iq, or the sum (the proportion/integration of the error of the q-axis current: $KPQ(Iq^*-iq)+KIQ(\int(Iq^*-iq)dt)$) of the proportion and the integration of the error between the q-axis current command Iq* and the q-axis current Iq in a preset ratio.

It is also possible to use, an error (the proportion of the error of the d-axis current: Id*−Id) between the d-axis current command Id* and the d-axis current Id, an integration of the error (the integration of the error of the d-axis current: $\int(Id^*-Id)dt$) between the d-axis current command Id* and the d-axis current Id, or the sum (the proportion/integration of the error of the q-axis: $KPD(Id^*-Id)+KID(\int(Id^*-Id)dt)$) of the proportion and the integration of the error between the d-axis current command Id* and the d-axis current Iq.

Furthermore, the saturation degree can be produced based on both the error of q-axis current and the error of d-axis current. It is possible to use the sum ($\{KIQ(\int(Iq^*-Iq)dt)\}^2+\{KID(\int(Id^*-Id)dt)\}^2$) of the square of the integration of the error of the q-axis current and the square of the integration of the error of the d-axis current, or the sum ($\{KPQ(Iq^*-Iq)+KIQ(\int(Iq^*-Iq)dt)\}^2+\{KPD(Id^*-Id)+KID(\int(Id^*-Id)dt)\}^2$) of the square of the proportion/integration of the error of the q-axis current and the square of the proportion/integration of the error of the d-axis current.

[Operation of reference value production unit 30]

The reference value production unit 30, as seen from equation 14, produces a reference value Ref as the product of a preset constant Ref0, a correction coefficient Krefa for the q-axis current command Iq*, a correction coefficient Krefb for the rotational speed ω, a correction coefficient Krefc for the source voltage Vba and a correction coefficient Krefd for the condition index Fcond.

$$\begin{cases} Ref = Krefa \cdot Krefb \cdot Krefc \cdot Krefd \cdot Ref0 \\ Krefa = \begin{cases} Krefa1(Iq^* \geq Iq^*1) \\ Krefa2 + (Krefa1 - Krefa2) \cdot \frac{Iq^*}{Iq^*1} \\ (0 \leq Iq^* < Iq^*1) \\ Krefa2(Iq^* < 0) \end{cases} \\ Krefb = Krefb1 + Krefb2 \cdot \omega \\ Krefc = Krefc1 + Krefc2 \cdot Vba \\ Krefd = \begin{cases} Krefd1(Fcond = 1) \\ Krefd2(Fcond = 0) \\ Krefd3(Fcond = -1) \end{cases} \end{cases} \quad (14)$$

$Krefd1 < Krefd2 < Krefd3$

Figure 8A:
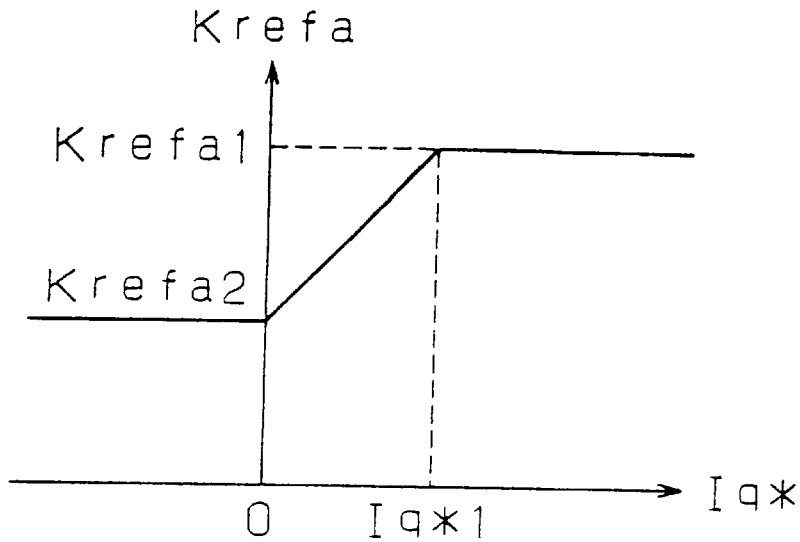
FIG. 8A is a diagram showing the relation between the correction coefficient of the reference value and the q-axis current command according to the first embodiment.

The correction coefficient Krefa for the q-axis current command Iq*, as shown in FIG. 8A, is defined as Krefa1 when the q-axis current command Iq* is not less than Iq*1 (Iq*≧Iq*1). At the time of regeneration (Iq*<0), on the other hand, the correction coefficient Krefa is defined as Krefa2. Further, when the q-axis current command is positive and smaller than Iq*1 (0≦Iq*<Iq*1), the correction coefficient Krefa is defined as a linear function with respect to the q-axis current command Iq*, and is made continuous when Iq*=0 or Iq*1, where Krefa1 is larger than Krefa2. In this way, the correction coefficient Krefa is continuously and monotonically increased with respect to the q-axis current command Iq*.

Figure 8B:
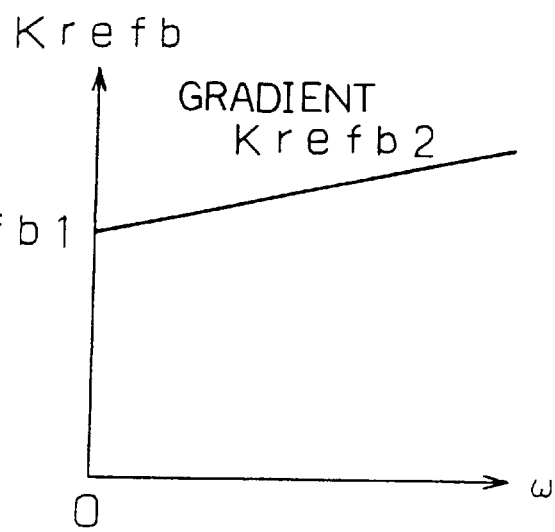
FIG. 8B is a diagram showing the relation between the correction coefficient of the reference value and the rotational speed according to the first embodiment.

The correction coefficient Krefb for the rotational speed ω, as shown in FIG. 8B, is defined as a monotonically-decreasing linear function of the rotational speed ω with a segment Krefb1 and a gradient Krefb2.

Figure 8C:
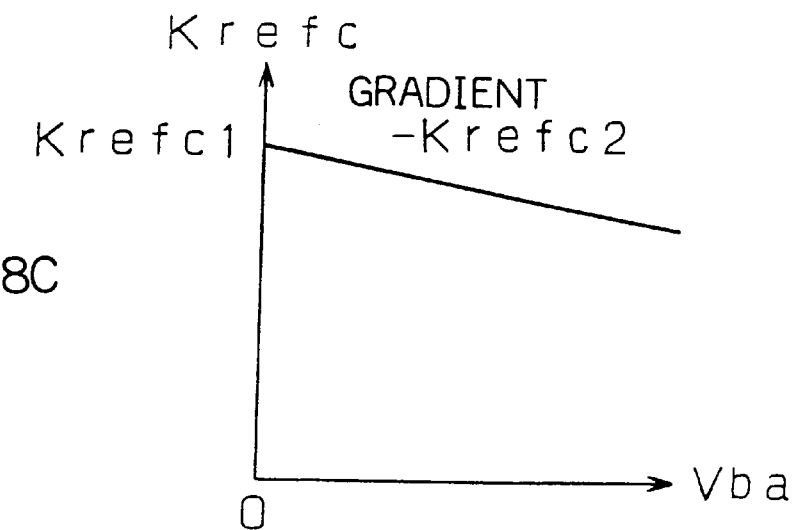
FIG. 8C is a diagram showing the relation between the correction coefficient of the reference value and the source voltage according to the first embodiment.

The correction coefficient Krefc for the source voltage Vba, as shown in FIG. 8C, is defined as a monotonically-decreasing linear function of the source voltage Vba with a segment Krefc1 and a gradient −Krefc2.

The correction coefficient Krefd for the condition index Fcond, as seen from equation 14, is defined as Krefd1 when the condition index Fcond is 1, as Krefd2 when the condition index Fcond is 0, and as Krefd3 when the condition index Fcond is −1, on the assumption that Krefd1<Krefd2<Krefd3.

[Operation of gain production unit 40]

Figure 20:
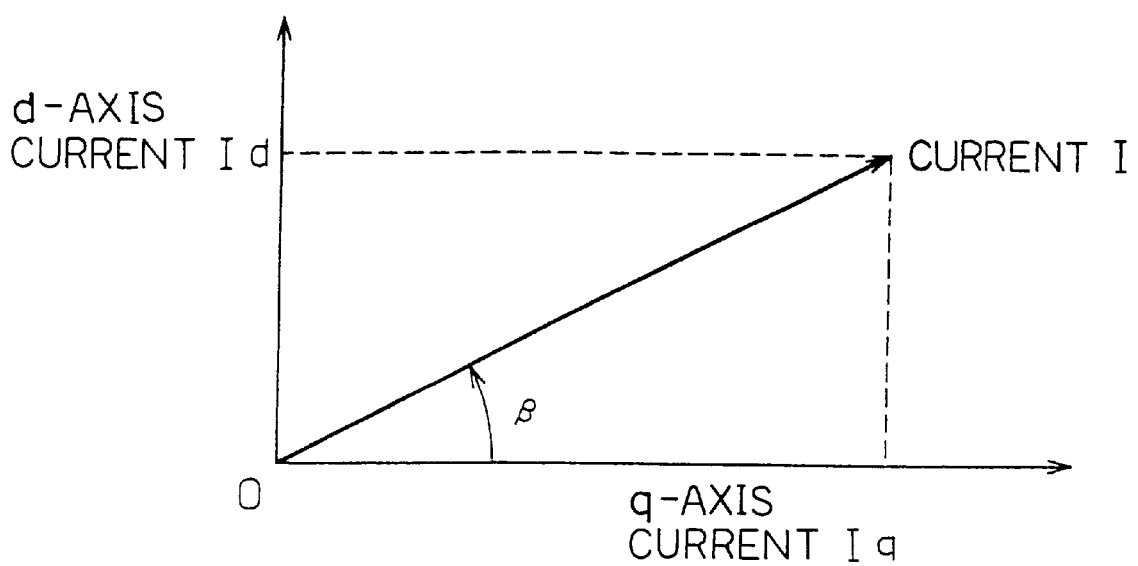
FIG. 20 is a diagram showing the relation between the d-axis current, the q-axis current and the current phase.

The gain production unit 40, as seen from equation 15, produces a gain Gai which is the product of a constant Gai0, a correction coefficient Kgaia for the current phase command β*, a correction coefficient Kgaib for the rotational speed ω, a correction coefficient Kgaic for the magnitude |I*| of the current command and a correction coefficient Kgaid for the condition index Fcond, where the magnitude |I*| of the current command and the current phase command β* represent the magnitude and phase, respectively, of the current commands indicated by the q-axis current command Iq* and the d-axis current command Id* (FIG. 20).

$$\begin{cases} Gai = Kgaia \cdot Kgaib \cdot Kgaic \cdot Kgaid \cdot Gai0 \\ Kgaia = \begin{cases} Kgaia1 - (Kgaia1 - Kgaia2) \cdot \frac{\beta^* - \beta0}{\beta^*1 - \beta0} \\ (\beta0 \leq \beta^* < \beta^*1) \\ Kgaia2(\beta^* \geq \beta^*1) \end{cases} \\ Kgaib = Kgaib1 - Kgaib2 \cdot \omega \\ Kgaic = Kgaic1 - Kgaic2 \cdot |I^*| \\ Kgaid = \begin{cases} Kgaid1(Fcond = 0) \\ Kgaid2(Fcond = -1,1) \end{cases} \end{cases} \quad (15)$$

$Kgaid1 < Kgaid2$

Figure 9A:
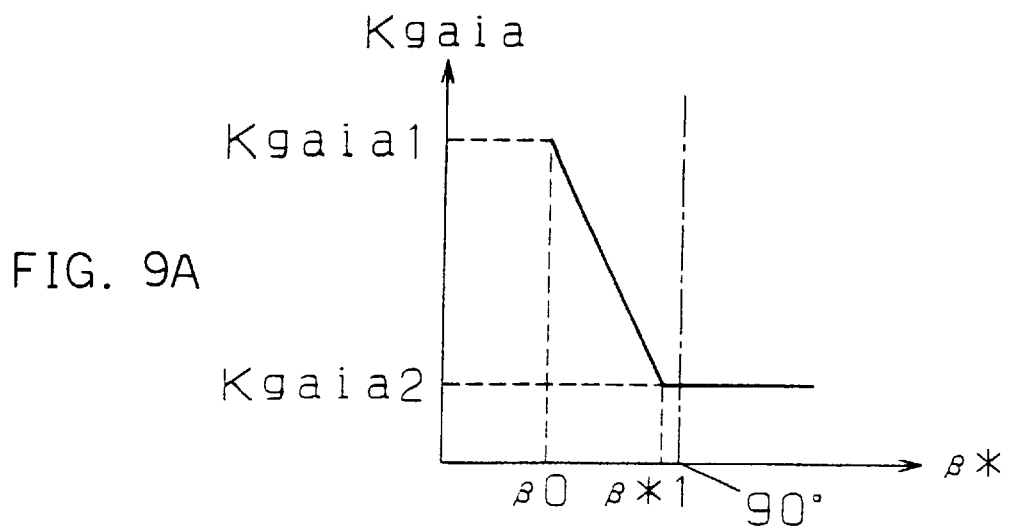
FIG. 9A is a diagram showing the relation between the gain correction coefficient and the current phase command according to the first embodiment.

The correction coefficient Kgaia for the current phase command β*, as shown in FIG. 9A, is defined as Kgaia1 when the current phase command β* is β0 (β*=β0). Also, when the current phase command β* is not less than β*1 (β*≧β*1), the correction coefficient Kgaia is defined as Kgaia2. Further, in the case where the current phase command β* is not less than β0 but smaller than β*1 (β0≦β*<β*1), the correction coefficient Kgaia is defined as a linear function of the current phase command β* and is made continuous when β*=β0 or β*1. In the process, Kgaia1 is larger than Kgaia2. In this way, the correction coefficient Kgaia is continuously and monotonically reduced with respect to the current phase command β*.

Figure 9B:
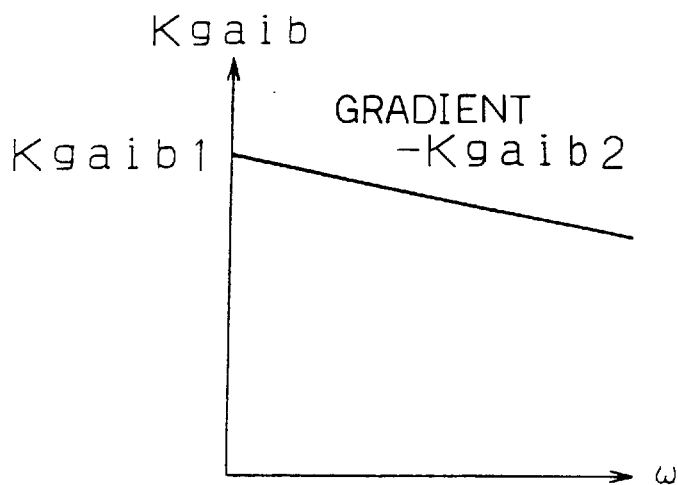
FIG. 9B is a diagram showing the relation between the gain correction coefficient and the rotational speed according to the first embodiment.

The correction coefficient Kgaib for the rotational speed ω, as shown in FIG. 9B, is defined as a monotonically-decreasing linear function of the rotational speed ω with a segment Kgaib1 and a gradient −Kgaib2.

Figure 9C:
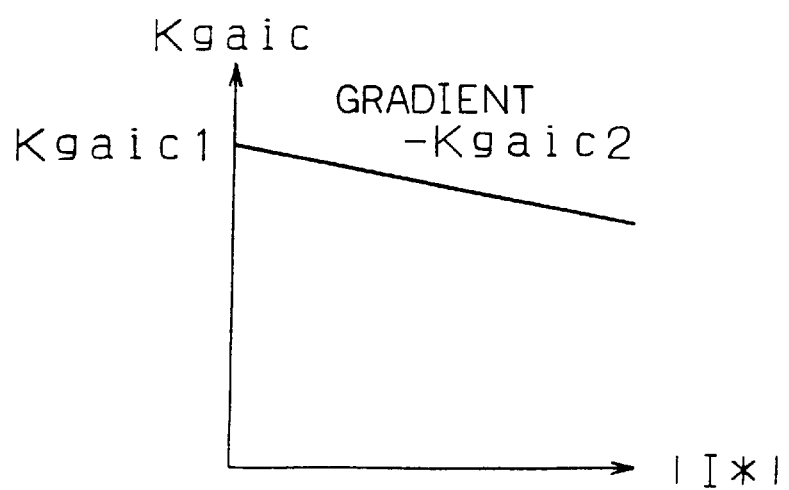
FIG. 9C is a diagram showing the relation between the gain correction coefficient and the magnitude of the current command according to the first embodiment.

The correction coefficient Kgaic for the magnitude |I*| of the current command, as shown in FIG. 9C, is defined as a monotonically-decreasing linear function of the magnitude |I*| of the current command with a segment Kgaic1 and a gradient −Kgaic2.

The correction coefficient Kgaid for the condition index Fcond, as seen from equation 15, is defined as Kgaid1 when the condition index Fcond is 0, and as Kgaid2 when the condition index Fcond is −1 or 1, where Kgaid1<Kgaid2.

[Operation and effect of current command vector]

Figure 10A:
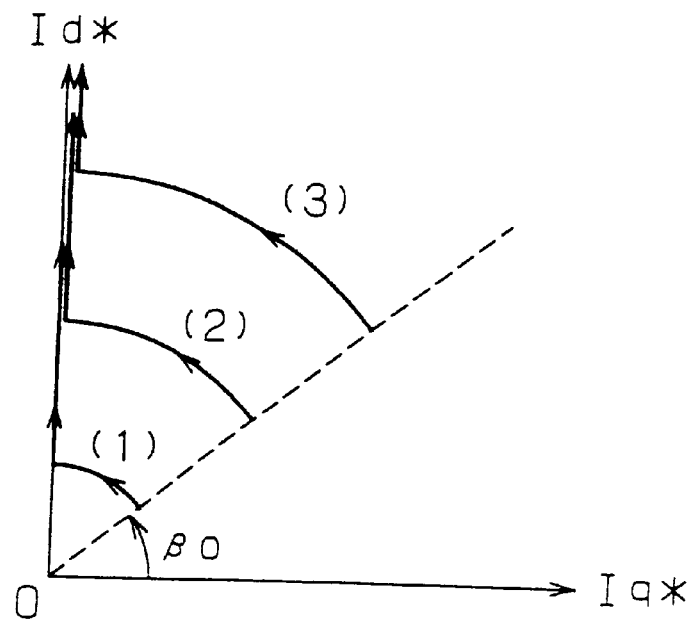
FIG. 10A is a diagram showing the trace of a current vector according to the first embodiment.
Figure 10B:
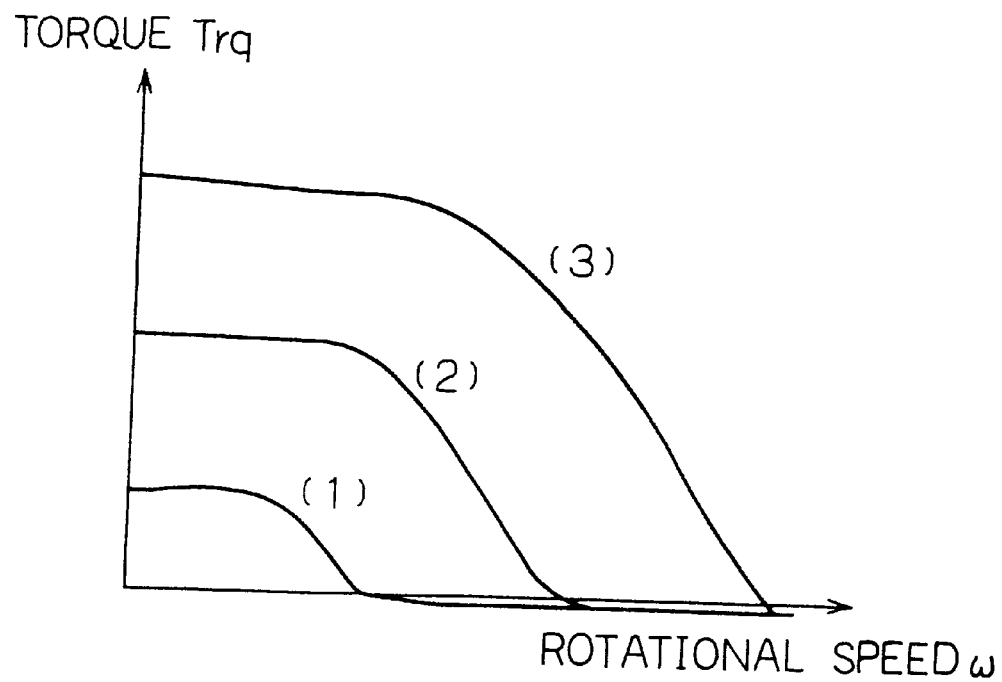
FIG. 10B is a diagram for explaining the torque characteristic when the current vector is changed in FIG. 10A.

In dynamic mode, step 117 (FIG. 2) in the current command production unit 50 branches to the operation-on-current-index-circumference mode (step 118) and the operation-on-d-axis mode (step 119). FIG. 10A is a diagram for explaining the trace of the current vector according to the first embodiment, in which each circumference represents the magnitude of the current index. With the increase in the rotational speed ω of the brushless motor, a voltage margin is lost soon, so that the saturation degree Sat increases, with the result that step 114 increases the d-axis current command Id*, thereby changing the current commands (Iq*, Id*) in the direction of arrows. First, the current commands (Iq*, Id*) move along the current index circumferences until the current phase commands change from β to 90° (operation-on-current-command-circumference mode). After that, the current commands move along the d-axis while increasing the d-axis current command Id* (operation-on-d-axis mode). In the process, β0 represents the current phase (FIG. 21) for realizing the maximum output torque Trq of the brushless motor. In the operation-on-current-command-circumference mode, therefore, the current phase β advances and the output torque Trq decreases with the increase in the rotational speed ω (portions declining rightward in FIG. 10B). In the operation-on-d-axis mode, on the other hand, Iq*=0, and therefore the output torque Trq is 0 (portion where Trq=0 in FIG. 10B) as seen from equation 2.

With the increase of the current index from (1) to (2) to (3) in proportion to the accelerator value, the output torque Trq also increases from (1) to (2) to (3).

Now, assume that the motor controller is used for an electric vehicle. In the case where the actuation angle of the accelerator pedal is constant, an increase in output torque with the rotational speed accelerates the electric vehicle more than desired by a driver. The driver thus would have the sense of incongruity. In view of the fact that the driver manipulates the electric vehicle on the assumption that the output torque increases with the increase in the actuation amount of the accelerator pedal, a decreased output torque with the increased accelerator value upon actuation of the accelerator pedal would cause the driver to have the sense of incongruity, thereby often deteriorating the riding quality of the electric vehicle.

As described above, an increased rotational speed ω reduces the output torque Trq, and the direction in which the accelerator value increases coincides with the direction in which the output torque Trq increases in all the ranges of rotational speed. Therefore, a safe and more natural drive can be realized.

[Effect of gain production unit 40]

With the increase in gain Gai, the d-axis current command Id* is settled at an earlier time as seen from equation 8. Therefore, the larger gain Gai is preferable. An increased gain Gai, however, increases the vibration of the d-axis current command Id* due to the noises contained in the saturation degree Sat or the delay in the processing time, with the result that the output torque Trq vibrates considerably. Then, the motor controller used with the electric vehicle deteriorates the riding quality of the vehicle. Thus the need arises to reduce the gain Gai to some extent and thus to suppress the vibration of the d-axis current command Id*.

Figure 21:
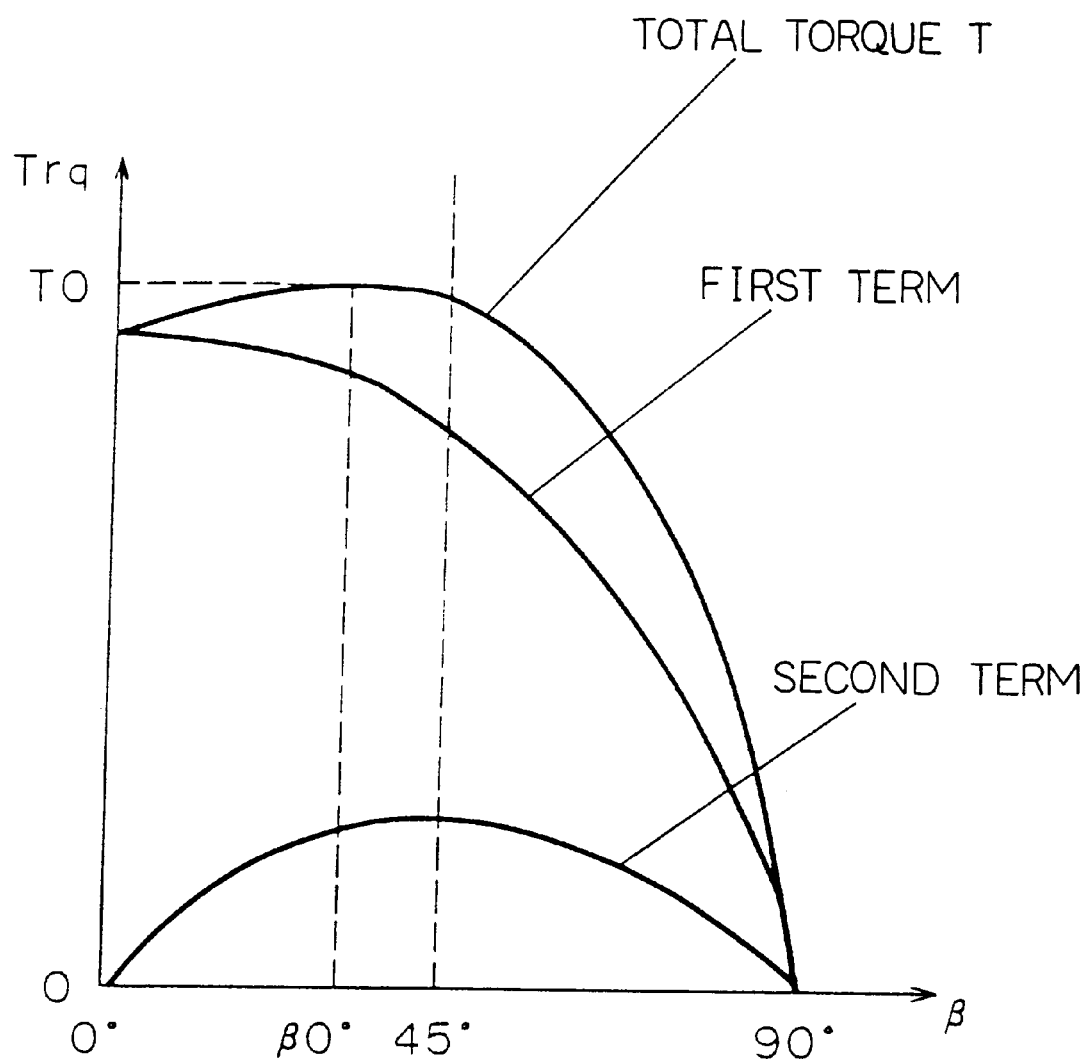
FIG. 21 is a diagram showing the relation between the current phase and the output torque of an Interior Permanent Magnet motor (IPM motor).
Figure 22A:
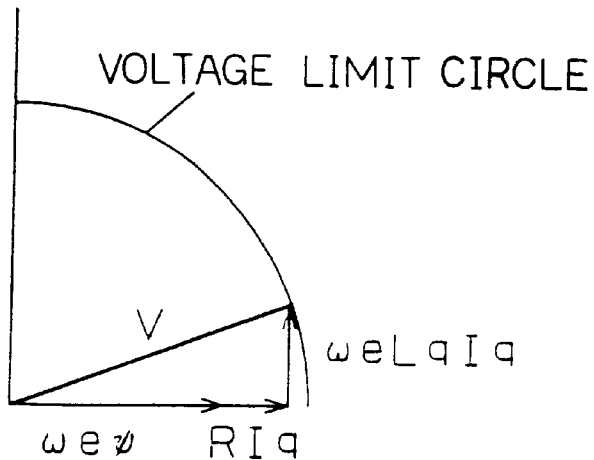
FIGS. 22A, 22B and 22C are vector diagrams for field-weakening control.
Figure 22B:
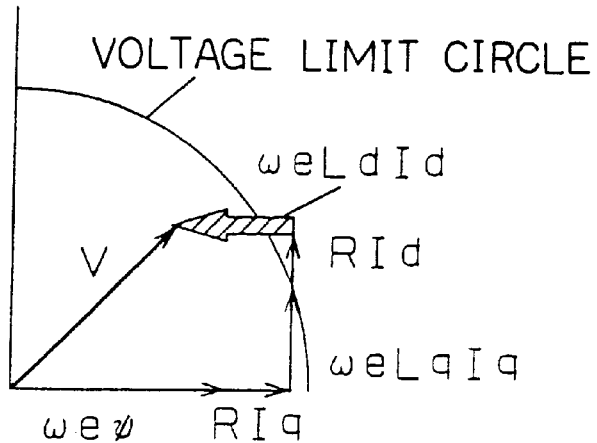
Figure 22C:
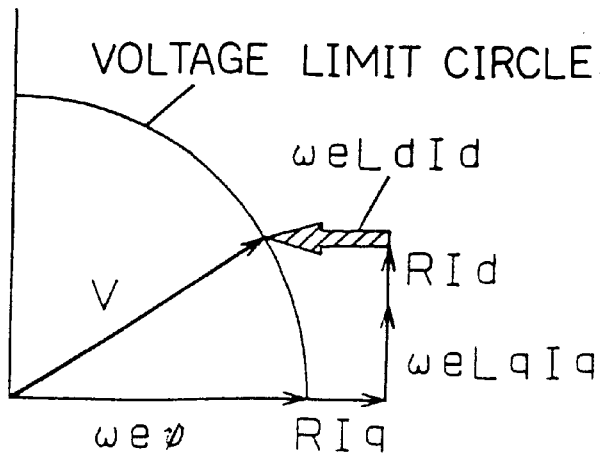

Now, as seen from FIG. 21, the gradient of the output torque Trq with respect to the variation in the current phase β is very small in the neighborhood of the current phase β0 providing the maximum output Trq. Since the gradient increases in the neighborhood of 90° after the current phase β is advanced, however, a variation in the current phase β in the neighborhood of 90° considerably changes the output torque Trq. Also, as seen from equation 16, when the current phase β approaches 90°, I·cos β decreases. Even when the d-axis current Id is slightly changed, therefore, the current phase β undergoes a considerable change. In such a case, assume that the gain Gai is rendered constant regardless of the current phase command β*. Even if a gain Gai is applied which causes no vibration of the d-axis current command Id* with the current phase β in the neighborhood of β0, the current command Id* sometimes vibrates when the current phase β approaches 90°. In view of this, as shown in equation 15, the correction coefficient Kgaia for the current phase command β* is decreased with the increase in the current phase command β*.

As described above, with the advance of current phase β, the gain Gai is reduced. Thus, an optimum gain Gai can be achieved in a wide range of rotational speed, thereby realizing a stable output torque Trq.

$$\begin{cases} Id = I \cdot \sin\beta \\ \Delta Id = \Delta\beta \cdot I \cdot \cos\beta \end{cases} \quad (16)$$

Also, with the increase in the rotational speed ω of the brushless motor, the integration time of the absolute value of the current error for producing the saturation degree Sat is shortened (equation 5), and the accuracy of the saturation degree Sat is deteriorated. If the gain Gai is made constant regardless of the rotational speed ω, therefore, the d-axis current command Id*, though not vibrated in the range of low rotational speeds, may be vibrated in the range of high rotational speeds. As seen from equation 15, when the rotational speed ω increases, the correction coefficient Kgaib for the rotational speed ω is decreased.

As described above, when the rotational speed ω of the brushless motor increases, the gain Gai is reduced, whereby the optimum gain Gai is achieved over a wide range of rotational speeds, thereby realizing a stable output torque Trq.

Further, an increased magnitude |I*| of the current command sometimes causes an increased noise in the saturation degree Sat due to the noise generated in the drive unit 10. In the case where the gain Gai is made constant regardless of the magnitude |I*| of the current command, therefore, the d-axis current command Id*, even though not vibrated when the magnitude |I*| of the current command is small, sometimes vibrates when the magnitude |I*| of the current command increases. In view of this, as seen from equation 15, when the magnitude |I*| of the current command increases, the correction coefficient Kgaic for the magnitude |I*| of the current command is decreased.

As described above, when the absolute value |I*| of the current command increases, the gain Gai is decreased, so that an optimum gain Gai is attained, thereby realizing a stable output torque Trq.

Also, when the operating condition such as the accelerator value Acc or the rotational speed ω undergoes a change, so does the value at which the d-axis current command Id* converges. In the case where the gain Gai is made constant regardless of the operating condition, therefore, a change in the operating condition may deteriorate the response. In view of this, as indicated by equation 15, the correction coefficient Kgaid is reduced when the operating condition remains unchanged (condition index Fcond=0), and the correction coefficient Kgaid is increased when the operating condition undergoes a change (condition index Fcond=1 or –1).

A stable operation can thus be realized by reducing the gain Gai when the operating condition remains unchanged as described above. When the operating condition changes, on the other hand, the gain Gai is increased thereby to attain a high response.

Although the present embodiment concerns the correction with respect to the current phase command β*, the rotational speed ω, the magnitude |I*| of the command current and the condition index Fcond, the correction with respect to at least one of them is still effective. Especially, with an increase in the rotational speed ω, the motor controller according to this embodiment loses the voltage margin and operates to advance the current phase command β* for increasing the voltage margin. Thus the rotational speed ω and the current phase command β* are deeply correlated to each other. The use of only one of them, therefore, has a great effect.

The method of correction can be modified in various ways using other than the functions according to the present embodiment.

Further, the ratio between the d-axis current command Id* and the q-axis current command Iq* (Id*/Iq*) can be used in place of the current phase command β*. Also, the magnitude |I*| of the current command can be replaced with the magnitude |Iq*| of the q-axis current command.

Also, the condition index Fcond, which has three values of –1, 0 and 1, can alternatively have a continuous value so that the correction coefficient Kgaid may be continuously changed. In such a case, a finely detailed control results.

Although the condition index Fcond, which assumes a value other than 0 only when the operating condition has changed, can alternatively be held at –1 or 1 only during a preset time after the operating condition changes. As a result, even when the accelerator value Acc changes, the d-axis current command Id* is not converged to some value immediately but only after a certain length of time. By holding the value of the condition index Fcond during this time, the convergence of the d-axis current command Id* can be advanced thereby to realize a high response.

[Effect of reference value production unit 30]

In the case where the reference value Ref for regeneration mode and the reference value Ref for dynamic mode are constant and the former is smaller than the latter, the d-axis current command id* is liable to be larger for regeneration mode. With a given small current index Iin for dynamic mode and a given small current index Iin for regeneration mode, therefore, the d-axis current command Id* for regeneration mode is larger for a larger output torque Trq. The driver manipulates the electric vehicle on the assumption that the output torque is increased by actuating the accelerator pedal. If the output torque is decreased in spite of increasing the extent of actuation of the accelerator pedal, therefore, the driver may have the sense of incompatibility and the riding quality would deteriorate. In view of this, as seen from equation 14, when the q-axis current command Iq* decreases, the correction coefficient Krefa for the q-axis current command Iq* is continuously reduced.

As described above, when the q-axis current command Iq* increases, the reference value Ref is continuously increased. The motor controller, when used with the electric vehicle, can realize a safe and more natural drive.

An increased rotational speed ω increases the delay of the stator current iu with respect to the stator current command iu* for an increased current error (iu*–iu), resulting in an increased saturation degree Sat. For this reason, even when an optimum reference value is set for low rotational speed range, the saturation degree increases for high rotational speed range, so that the reference value is relatively reduced, thereby making it sometimes impossible to produce an optimum d-axis current command Id*. To obviate this problem, as seen from equation 14, when the rotational speed ω increases, the correction coefficient Krefb for the rotational speed ω is increased.

As described above, when the rotational speed ω increases, the reference value Ref is increased. Thus, an optimum reference value Ref is achieved in wide rotational speed range, thereby realizing a stable output torque Trq.

Further, an increased source voltage Vba permits the stator current iu to follow the stator current command iu* more faithfully, and the resultant smaller current error (iu*–iu) leads to a reduced saturation degree Sat. Consequently, even when an optimum reference value is set for a given source voltage, an increased source voltage Vba reduces the saturation degree Sat and relatively increases the reference value. An optimum d-axis current command Id* thus is not produced. In view of this, when the source voltage Vba is increased, as shown in equation 14, the correction coefficient Krefc for the source voltage Vba is reduced.

In the case where the source voltage Vba increases, the reference value Ref is reduced as described above. In this way, an optimum reference value Ref is attained and a stable output torque Trq can be realized over a wide rotational speed range.

Also, a change in the operating condition such as the accelerator value Acc or the rotational speed ω causes a change in the value to which the d-axis current command Id* converges. If the reference value Ref is set constant regardless of the operating condition, therefore, the response may deteriorate when the operating condition undergoes a change. In view of this, as shown in equation 14, when the operating condition changes toward a larger output (such as when the accelerator value Acc or the rotational speed ω increases, i.e. when the condition index Fcond=1), the correction coefficient Krefd is reduced. In the case where the change of the operating condition is in such a direction to reduce the output (such as when the accelerator value Acc or the rotational speed ω is decreased, i.e. when the mode index Fcond=–1), in contrast, the correction coefficient Krefd is increased.

In the event that the operating condition changes in such a direction as to increase the output, it is necessary to increase the d-axis current Id in order to enhance the effect of the field-weakening control. In the case where the operating condition changes in such a direction as to reduce the output, on the other hand, a reduced d-axis current is required to reduce the effect of the field-weakening control.

As described above, when the operating condition changes in such a direction as to increase the output, the reference value Ref is reduced. In this way, the d-axis current command Id* is rapidly increased (equation 8) thereby to realize a quick response. In the event that the operating condition changes in such a direction as to reduce the output, on the other hand, the d-axis current command Id* is rapidly reduced by increasing the reference value Ref (equation 8), thus realizing a quick response.

According to this embodiment, the correction is performed as to the q-axis current command Iq*, the rotational speed ω, the source voltage Vba and the condition index Fcond. Nevertheless, correction of at least one of these parameters is effective. An increased source voltage Vba causes the operating area transfer to a higher rotational speed range. When a source voltage Vba increases, decrease of the saturation degree Sat owing to increase of the source voltage Vba itself and increase of the saturation degree Sat owing to increase of the rotational speed ω occur simultaneously. It depends on the system involved, therefore, whether the reference value should be decreased or increased. Care should be exercised, therefore, when the rotational speed ω is not used but the source voltage Vba for correction.

Also, the method of correction is not limited to the functions used in the present embodiment, but can be modified variously.

Further, an increased rotational speed ω leads to the loss of the voltage margin, so that the increased saturation degree Sat increases the d-axis current command Id* and advances the current phase command β*. Therefore, the current phase command β* can be used in place of the rotational speed ω.

Although the condition index Fcond has three values of −1, 0 and 1, it can alternatively have a continuous value with the correction coefficient Kgaid being continuously changed. In such a case, a more finely detailed control results.

The condition index Fcond is adapted to assume other than 0 only when the condition changes. Alternatively, the condition index Fcond can be held at −1 or 1 for a certain preset time after the condition changes. Even when the accelerator value Acc changes, the d-axis current command Id* does not converge to a value immediately but after some length of time. By holding the condition index Fcond during this time length, however, the time required for the d-axis current command Id* to converge is advanced thereby to realize a quick response.

[Effect of correcting q-axis current command]

The brushless motor, when rotated, generates a negative output even in the case where the stator current commands iu*, iv*, iw* are set to 0. A detailed explanation follows.

Figure 11A:
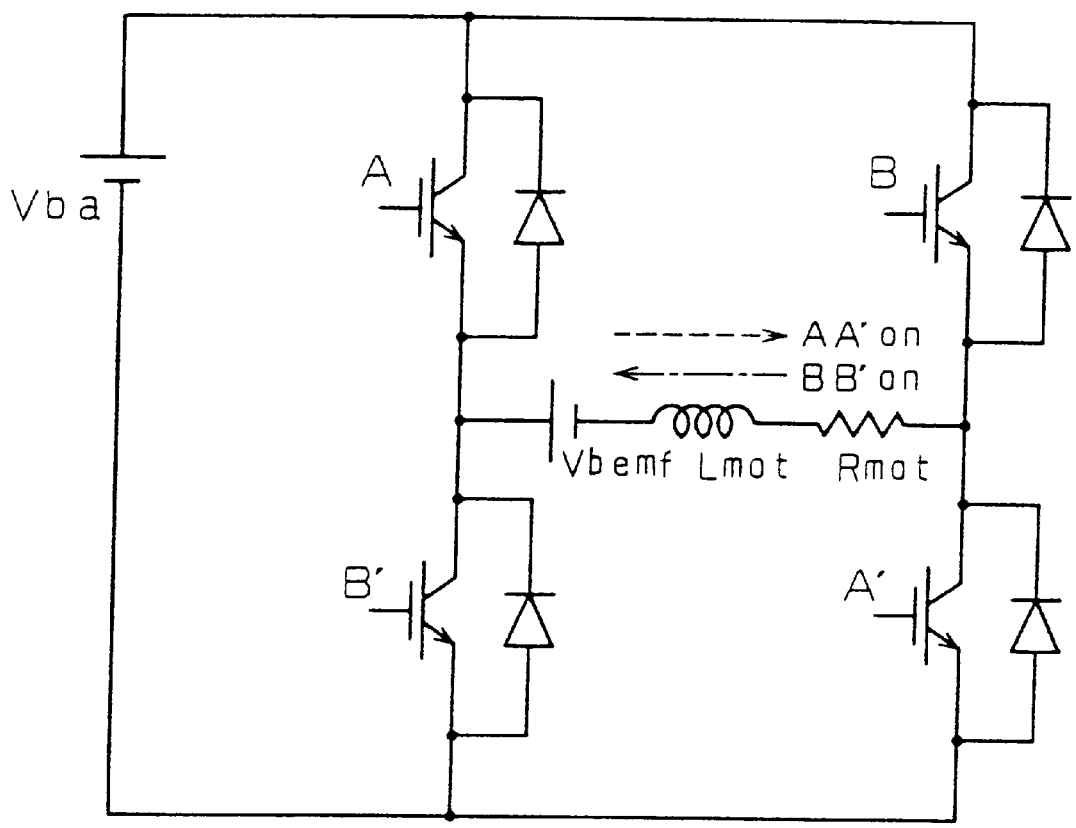
FIG. 11A is a circuit diagram showing a model of a single-phase inverter.

For simplicity's sake, the explanation refers to a single-phase inverter. FIG. 11A is a circuit diagram showing a single-phase inverter. The single-phase inverter is driven by a drive voltage Vba, and a full bridge circuit is configured of IGBTs (A, A', B, B') and diodes to which a counter electromotive force Vbemf and a load are connected. The load includes a motor inductance Lmot and a motor resistance Rmot.

Figure 11B:
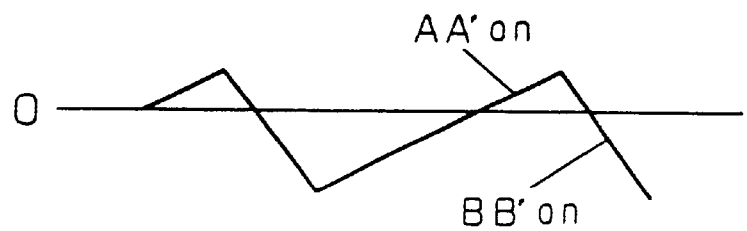
FIG. 11B is a diagram showing current waveform in FIG. 11A.
Figure 12:
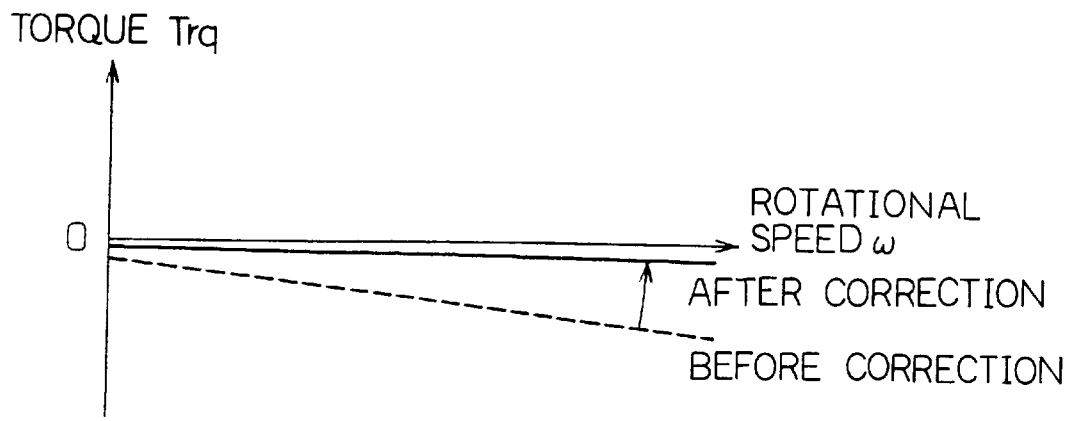
FIG. 12 is a diagram for explaining the torque characteristic before and after correction of the q-axis current command according to the first embodiment.

When a current is supplied against the counter electromotive force Vbemf, the IGBTs (A, A') are made conductive while the IGBTs (B, B') are made nonconductive. In the process, the current tries to flow in the direction of dotted line (AA' on). The load, therefore, is impressed with the voltage (Vba−Vbemf). When a current flows in the same direction as the counter electromotive force Vbemf, on the other hand, the IGBTs (A, A') are made nonconductive while the IGBTs (B, B') are made conductive. At the same time, the current tries to flow in the direction of one-dot chain (BB' on). Therefore, the load is impressed with a voltage (Vba+Vbemf). The current gradient is proportional to the voltage applied to the load. As shown in FIG. 11B, therefore, the current gradient is smaller when the current flows in the direction opposite to the counter electromotive force Vbemf (AA' on) than when the current flows in the same direction as the counter electromotive force Vbemf (BB' on). In view of the fact that a current is supplied in the direction opposite to the counter electromotive force Vbemf in dynamic mode and in the same direction as the counter electromotive force Vbemf in regeneration mode, the positive side in FIG. 11B representing the dynamic mode generates a positive torque while the negative side representing the regeneration mode generates a negative torque. As shown in FIG. 11B, the average current waveform is negative, and therefore a negative torque is generated on the average.

As described above, assume that the stator currents iu, iv, iw are set to 0 at the time of coasting (when the current index Iin is 0). A negative torque is generated as shown by dashed line in FIG. 12. With the increase in the rotational speed ω, the induced voltage increases and therefore the absolute value of the negative torque generated also increases.

In the automotive vehicle driven by an internal combustion engine, the torque transmission to the driving wheels can be cut off by de-energizing the clutch. With the electric vehicle, on the other hand, in order to improve the transmission efficiency and reduce the cost of the driving system, a missionless, clutchless structure is desired in which the driving wheels are directly coupled through a gear or the like. In such a case, transmission cannot be cut off by de-energizing the clutch. When the brushless motor is rotated, therefore, a braking force is generated by a negative torque.

To correct this situation, as shown in step 121 (FIG. 3), a positive correction amount Iqcor is added to the q-axis current command Iq*. An increased q-axis current command increases the torque in positive direction. As shown by solid line in FIG. 12, therefore, the output torque Trq is corrected. Also, since the absolute value of the negative torque increases with the rotational speed ω, the correction amount Iqcor is increased with the increase in rotational speed ω thereby to realize a flat torque.

The q-axis current command is corrected as described above, thereby making it possible to realize a flat output torque with respect to the rotational speed ω.

The reason why step 134 in FIG. 3 branches to the q-axis current correction mode (step 135) and the q-axis current no-correction mode (no processing) will be explained. The q-axis current correction is unique to the coasting/regeneration mode. The reduction in the output torque with the increase in the rotational speed in dynamic mode poses no characteristic problem on the electric vehicle and therefore is not required for the electric vehicle. Now, consider the case where the vehicle is coasting (when Iq*=0 before correction) and the case where the vehicle is slightly powered (in dynamic mode) (when Iq*=0 before correction) with the current correction amount Iqcor of 20 A. The q-axis current command Iq* after correction at the time of coasting is 20 A. Unless the q-axis current is corrected in dynamic mode, on the other hand, the q-axis current command Iq* is 1 A. Therefore, the q-axis current command Iq* is larger at the time of coasting when the accelerator value Acc is smaller than in dynamic mode. The output torque Trq thus increases to such an extent that the relative magnitudes of the accelerator value Acc and the output torque Trq are inverted, often causing the sense of incompatibility on the part of the driver. In the case where the q-axis current command Iq* is smaller than the q-axis correction amount Iqcor in dynamic mode, therefore, the q-axis current command Iq* is set to the q-axis correction amount Iqcor.

As described above, the q-axis current command Iq* is corrected when it is small in dynamic mode while the q-axis current command Iq* is not corrected with the increase thereof. A safe and more natural drive is realized in this way.

Although the correction amount Iqcor is given as a linear function of the rotational speed, other functions can be used with equal effect.

In regeneration mode, on the other hand, the d-axis current command Id* alone is increased by field-weakening control, and therefore the second term in equation 2 increases for an increased negative torque. In order to secure a constant output torque Trq, therefore, the q-axis current command Iq* can be corrected by equation 2. The smaller the q-axis current command Iq* (the larger the absolute value), the larger the increment of the negative torque in the second term of equation 2. The correction amount of the q-axis current command Iq* thus increases.

Further, although the present embodiment is so configured that the q-axis current is not corrected when the q-axis current command Iq* increases in dynamic mode. As an alternative, the q-axis correction amount Iqcor can be gradually decreased with the increase in the q-axis current command Iq*. This embodiment represents one form of reducing the q-axis correction amount Iqcor with the increase in the q-axis current command Iq*.

According to this embodiment, the field-weakening control is combined with the q-axis current correction. Instead, the field-weakening control of other types using a map or the like can be combined with the q-axis current correction, or the q-axis current correction alone can be effectively used.

[Effect of compensation for current phase delay]

The drive unit 10 (FIG. 1) tries to supply the stator currents iu, iv, iw in conformance with the stator current commands iu*, iv*, iw*, respectively. Due to the inductance of the stator windings 1U, 1V, 1W, however, the stator currents iu, iv, iw are delayed behind the stator current commands iu*, iv*, iw*, respectively. Also, with the increase in the rotational speed ω, the period of the stator current commands iu*, iv*, iw* is shortened, thereby relatively increasing the delay. This delay is called the current phase delay.

Figure 13:
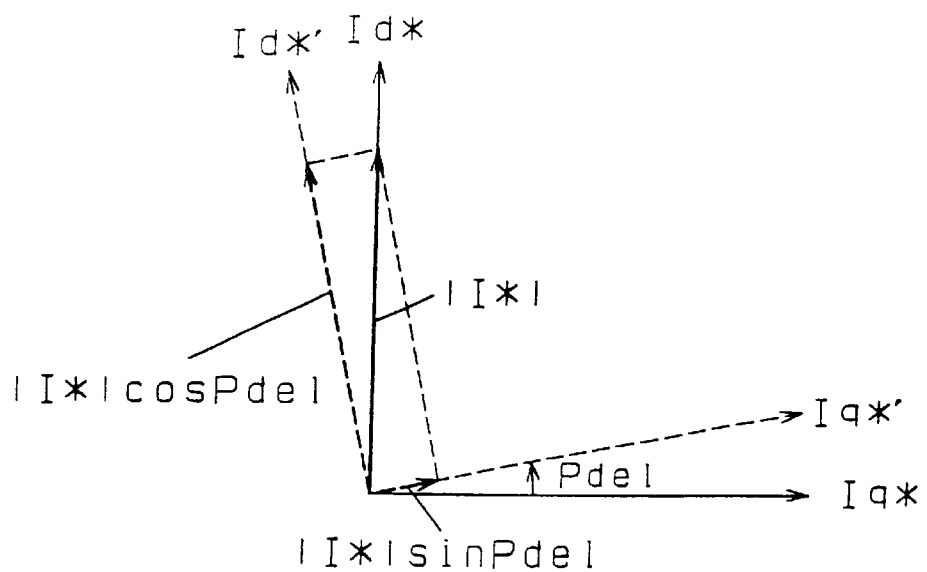
FIG. 13 is a diagram for explaining a current vector in the presence of a current phase delay.

As a result of an increased current phase delay, the driver of the electric vehicle may have the sense of incompatibility. With the current command production unit 50 in coasting mode, for example, the current command has a component of only the d-axis current command Id* due to the field-weakening control in high rotational speed range, and the q-axis current command Iq* is zero. This is shown in FIG. 13, which indicates a current vector having only the Id* component with the magnitude |I*| of the current command on the (Iq*-Id*) system. In the presence of a current phase delay, the operation is effectively performed on the (Iq*'-Id*') system which is obtained by rotating the (Iq*-Id*) system by the current phase delay amount Pdel. The (Iq*-Id*) system providing a command value, therefore, has no q-axis component (Iq* component) like (0, |I*|). The effective (Iq*'-Id*') system, however, has a q-axis component (Iq*' component) |I*|sinPdel such as (|I*|sin Pdel, |I*|cosPdel). Thus, as seen from equation 2, a positive torque is generated.

As a result, a positive torque is generated with the accelerator value Acc of 0 (in coasting mode) in high rotational speed range. The driver thus comes to have the sense of incompatibility, sometimes adversely affecting the riding quality of the electric vehicle. In view of this, the current vector (Iq*, Id*) is rotated by the current phase delay amount Pdel, and as shown in equations 17, converted into a value on a corrected (Iq*"-Id*") system. The second equation is subjected to second-order approximation assuming that Pcom is small, and is used as equation 11 for phase compensation (step 122) in the current command production unit 10.

$$\begin{pmatrix} Iq'' \\ Id'' \end{pmatrix} \begin{cases} = \begin{pmatrix} \cos(Pcom) & -\sin(Pcom) \\ \sin(Pcom) & \cos(Pcom) \end{pmatrix} \begin{pmatrix} Iq \\ Id \end{pmatrix} \\ = \begin{pmatrix} 1 - \dfrac{Pcom^2}{2} & -Pcom \\ Pcom & 1 - \dfrac{Pcom^2}{2} \end{pmatrix} \begin{pmatrix} Iq \\ Id \end{pmatrix} \end{cases} \quad (17)$$

As described above, the phase compensation permits the driver to manipulate the vehicle safely and more naturally without having any sense of incompatibility.

Although the phase compensation amount Pcom is subjected to second-order approximation according to this embodiment, the first-order approximation or third- or higher-order approximation can be employed with equal effect.

Also, the phase compensation amount Pcom, as shown in equation 10, can be alternatively rendered proportional to the rotational speed ω or can be given as another function or a table.

Further, unlike in the present embodiment in which the field-weakening control uses the saturation degree Sat, the field-weakening control by other methods using a table or the like is as effective as the above-mentioned method of phase compensation.

Second Embodiment

A second embodiment of the invention is simply a modification of the method of producing the q-axis current command Iq* in dynamic mode in the current command production unit 250. The remaining parts of the configuration are similar to those of the first embodiment and therefore will not be described again.

Figure 14:
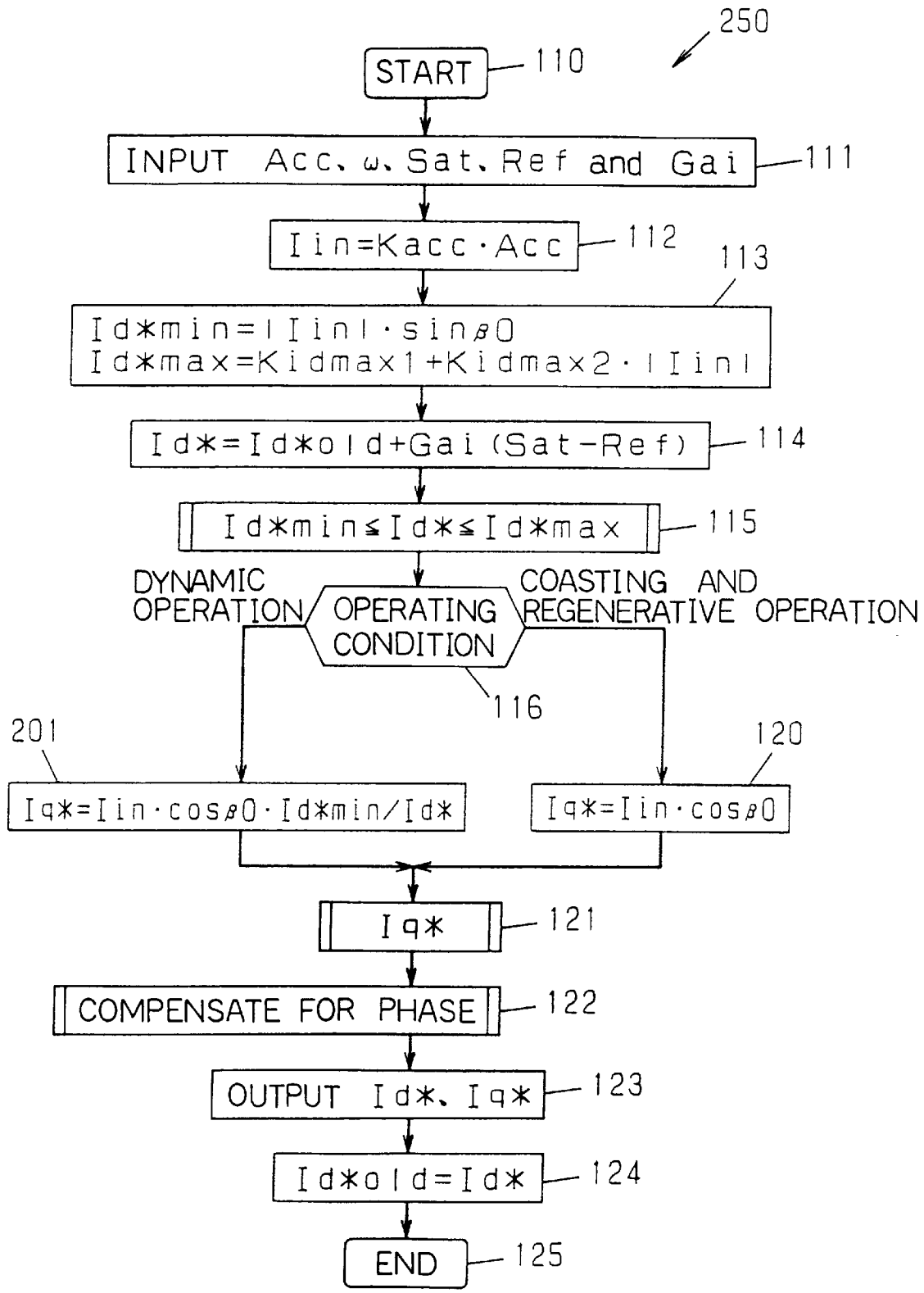
FIG. 14 is a flowchart showing the operation of the current command production unit according to a second embodiment.

FIG. 14 is a flowchart showing the operation of the current command production unit according to a second embodiment. The current command production unit 250 according to this embodiment performs the operation of step 201 in place of steps 117 to 119 in the current command production unit 50 according to the first embodiment. The remaining parts of operation are similar to those of the first embodiment and will not be described.

[Operation of current command production unit]

Step 201 produces a q-axis current command Iq* (dynamic mode). As seen from equation 18, the product of the current index Iin, cos β0 and the minimum value Id*min of the d-axis current command, divided by the d-axis current Id*, is defined as a q-axis current command Iq*.

The other parts of the configuration are similar to those of the first embodiment and will not be described.

$$Iq^* = Iin \cdot \cos\beta 0 \cdot \frac{Id^*min}{Id^*} \qquad (18)$$

[Operation and effect of current command vector]

In the case where the q-axis current command Iq* is produced as described above, assume that the rotational speed ω increases and so does the saturation degree Sat, so that the d-axis current command Id* is increased by the field-weakening control (by the operation of producing the d-axis current command Id* in step 114). While the q-axis current command Iq* is decreased, the product of the d-axis current command Id* and the q-axis current command Iq* is held at Iin·cos β0·Id*min (Id*·Iq*=Iin·cos β0·Id*min= constant). From equation 2, the first term of the output torque Trq is reduced by the decrease in the q-axis current command Iq*. Since Id*·Iq* is constant, the second term remains unchanged. Thus the output torque Trq is reduced.

In applications to the motor for the electric vehicle, an increased output torque with the increase in rotational speed would give the sense of incompatibility to the driver, sometime adversely affecting the riding quality of the vehicle.

According to this embodiment, as described above, an increased rotational speed ω reduces the output torque Trq, thereby realizing a safe, more natural driving condition.

Although the first embodiment has no operation-on-current-index-circumference mode (step 118 in FIG. 2), the use of a combination of the operation-on-current-index-circumference mode while operating a current vector while holding Id*·Iq* at a fixed value is also effective and is included in the present invention.

Also, unlike in the present embodiment in which the field-weakening control is effected using the saturation degree Sat, the field-weakening control by other methods using a table or the like is equally effective for executing the current command.

Third Embodiment

A motor controller according to a third embodiment is intended to determine the gain Gai real time from the vibration of the saturation degree Sat, etc.

Figure 15:
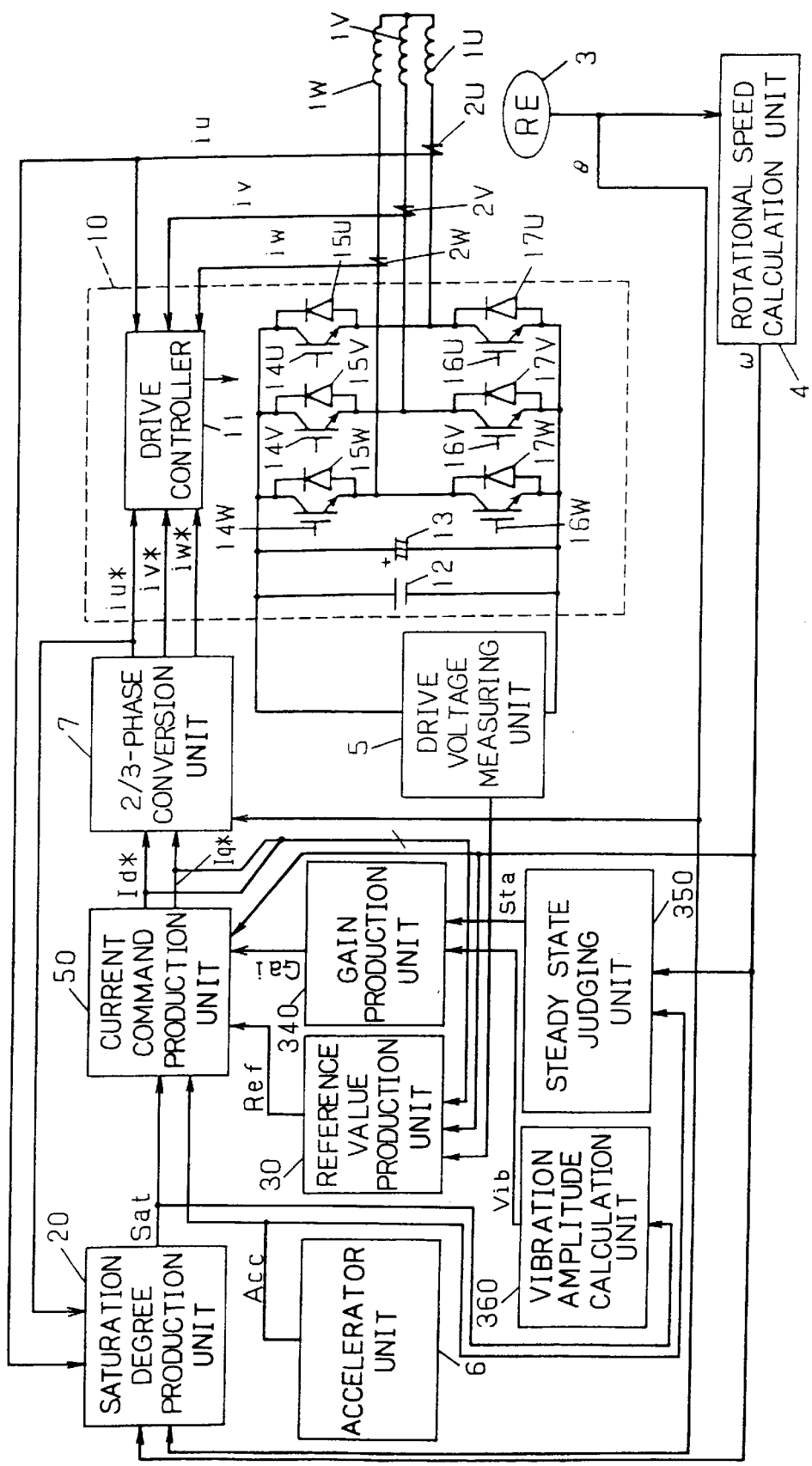
FIG. 15 is a block diagram of a motor controller according to a third embodiment.

FIG. 15 is a block diagram showing the operation of a motor controller according to a third embodiment. This embodiment, as compared with the first embodiment, is different only in that the condition judging unit 25 is done without, a steady state judging unit 350 and a vibration amplitude calculation unit 360 are added, and in that the gain production unit 340 operates differently. The remaining parts of the configuration are similar to those of the first embodiment and will not be described.

[General configuration and operation]

The steady state judging unit 350 produces a steady state signal Sta indicating whether the vehicle is in steady state or not, by a method described later, based on the rotational speed ω and the accelerator value Acc, and outputs the steady condition signal Sta to the gain production unit 340. The vibration amplitude calculation unit 360 produces a vibration amplitude Vib by a method described later, based on the saturation degree Sat, and outputs the vibration amplitude Vib to the gain production unit 340. The gain production unit 340, based on the steady state signal Sta and the vibration amplitude Vib, produces a gain Gai by a method described later, and outputs it to the current command production unit 50.

Also, as compared with the first embodiment, the rotational speed calculation unit 4 outputs the rotational speed ω also to the steady state judging unit 350 but not to the gain production unit 340. An accelerator unit 6 outputs the accelerator value Acc also to the steady state judging unit 350. A saturation degree production unit 20 outputs the saturation degree Sat also to the vibration amplitude calculation unit 360. The current command production unit 50 outputs no current command (Id*, Iq*) to the gain production unit 340.

The remaining parts of the configuration are similar to those of the first embodiment and will not be described.

[Operation of steady state judging unit 350]

The steady state judging unit 350 monitors the rotational speed ω and the accelerator value Acc. In the case where the difference between maximum and minimum values of the rotational speed ω is not more than a preset value and at the same time in the case where the difference between maximum and minimum values of the accelerator value Acc is not more than a preset level during a preset length of time, then, the steady state judging unit 350 judges that the vehicle is in steady state and raises the steady state signal Sta to high (H) level. In the other cases, the unit 350 judges that the vehicle is not in steady state and lowers the steady state signal to low (L) level.

Although the rotational speed ω and the accelerator value Acc are monitored according to this embodiment, any object can be monitored as far as a steady state can be determined by use of at least one of the saturation degree Sat, the current command and the stator current.

[Operation of vibration amplitude calculation unit 360]

The vibration amplitude calculation unit 360, as seen from equation 19, defines a vibration amplitude Vib from the difference between the maximum value max(Sat) and the minimum value min(Sat) of the saturation degree Sat during a predetermined period.

$$Vib = \{max(Sat) - min(Sat)\} \mid \text{PREDETERMINED PERIOD} \qquad (19)$$

[Operation of gain production unit 340]

Figure 16:
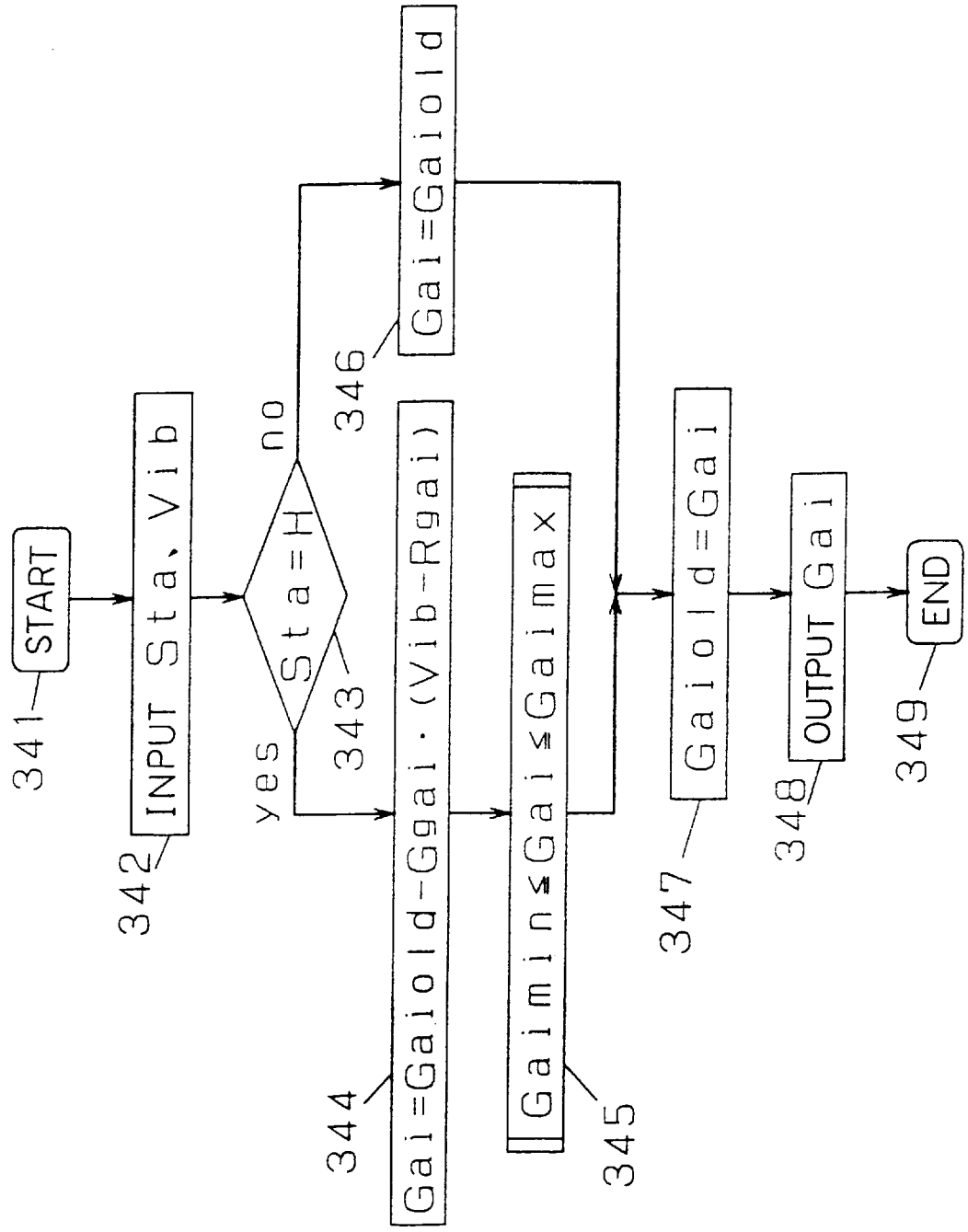
FIG. 16 is a flowchart showing the operation of the gain production unit according to the third embodiment.

FIG. 16 is a flowchart showing the operation of the gain production unit according to a third embodiment. A detailed description follows.

Step 341 starts producing a gain.

Step 342 inputs the steady state signal Sta and the vibration amplitude Vib.

Step 343 branches to the gain change mode and the gain no-change mode by the steady state signal Sta. When the steady state signal Sta is at high level (Sta=H), the gain change mode is entered, followed by execution of step 344. When the steady state signal Sta is at low level (Sta=L), on the other hand, the gain no-change mode is entered and step 346 is executed.

Step 344 produces the gain Gai (gain change mode). As seen from equation 20, the vibration amplitude Vib less a preset constant Rgai is multiplied by a preset constant Ggai, and the previous gain Gaiold is added to the product. In this way, the gain Gai is produced. The previous value of the gain Gai is stored as the previous gain Gaiold.

$$Gai = Gaiold - Ggai \cdot (Vib - Rgai) \qquad (20)$$

Step 345 limits the gain Gai. In the case where the gain Gai is smaller than a preset minimum value Gainmin (Gai<Gaimin), the gain Gai is changed to the minimum value Gaimin (Gai=Gaimin). In the case where the gain Gai is larger than a preset maximum value Gaimax (Gai>Gaimax), on the other hand, the gain Gai is changed to the maximum value Gaimax (Gai=Gaimax).

Step 346 produces the gain Gai (gain no-change mode). The previous value Gaiold is used as the gain Gai.

Step 347 holds the gain Gai. The gain Gai, which is used for the next step, is set to a new previous value Gaiold. A preset constant is given as an initial value of Gaiold.

Step 348 outputs the gain Gai.

Step 349 terminates the production of the gain Gai.

[Effect of third embodiment]

According to the first embodiment, the gain Gai is determined as a function of the current phase command $\beta^*$, the rotational speed $\omega$, the magnitude $|I^*|$ of the current command and the condition index Fcond. Also, due to the noise contained in the saturation degree Sat or the like, the gain Gai could not be much increased. Noises are varied from one operating condition or one motor controller to another. As a result, in order to produce a gain Gai smaller than a limit with a margin, the control response sometimes is delayed. Also, a different type of motor requires a different gain Gai, often making the design a difficult task. According to this embodiment, in contrast, as seen from equation 20, the gain Gai is reduced for a smaller vibration of the system when the vibration amplitude Vib indicating the system vibration is large. Conversely, in the case where the vibration amplitude Vib is small, the gain Gai is increased to quicken the system response.

As described above, according to this embodiment, the gain Gai is changed upward or downward by the vibration amplitude Vib. Thus an optimum gain Gai can be produced under different operating conditions, in spite of variations of the motor controller or for different types of motor. Consequently, the designing work is facilitated.

According to this embodiment, the vibration amplitude Vib is calculated from the saturation degree Sat. Assuming that the saturation degree Sat vibrates, however, the d-axis current command Id* produced based on the saturation degree Sat also vibrates and so do the stator current commands iu*, iv*, iw*. Thus, the effective values of the stator currents iu, iv, iw, the output torque Trq and the rotational speed $\omega$ also vibrate. As a result, the vibration amplitude Vib can be calculated based on not only the saturation degree Sat but also at least one of the current command, the stator currents iu, iv, iw, the output torque Trq and the rotational speed $\omega$.

Also, although the present embodiment uses the difference between maximum and minimum values during a predetermined length of time as an vibration amplitude, the dispersion or other parameters which can determine the degree of vibration can alternatively be used.

Further, a steady state is judged as long as the vibration amplitude Vib can be sufficiently retrieved from the saturation degree Sat or the system can be operated macroscopically.

The initial value of the gain Gai can be determined by the method according to the first embodiment, or the gain Gai determined by the method according to the present embodiment can be corrected by the method of the first embodiment.

Fourth Embodiment

A motor controller according to the fourth embodiment is intended to determine a reference value Ref real time from the relation between the saturation degree Sat and the rotational speed $\omega$.

Figure 17:
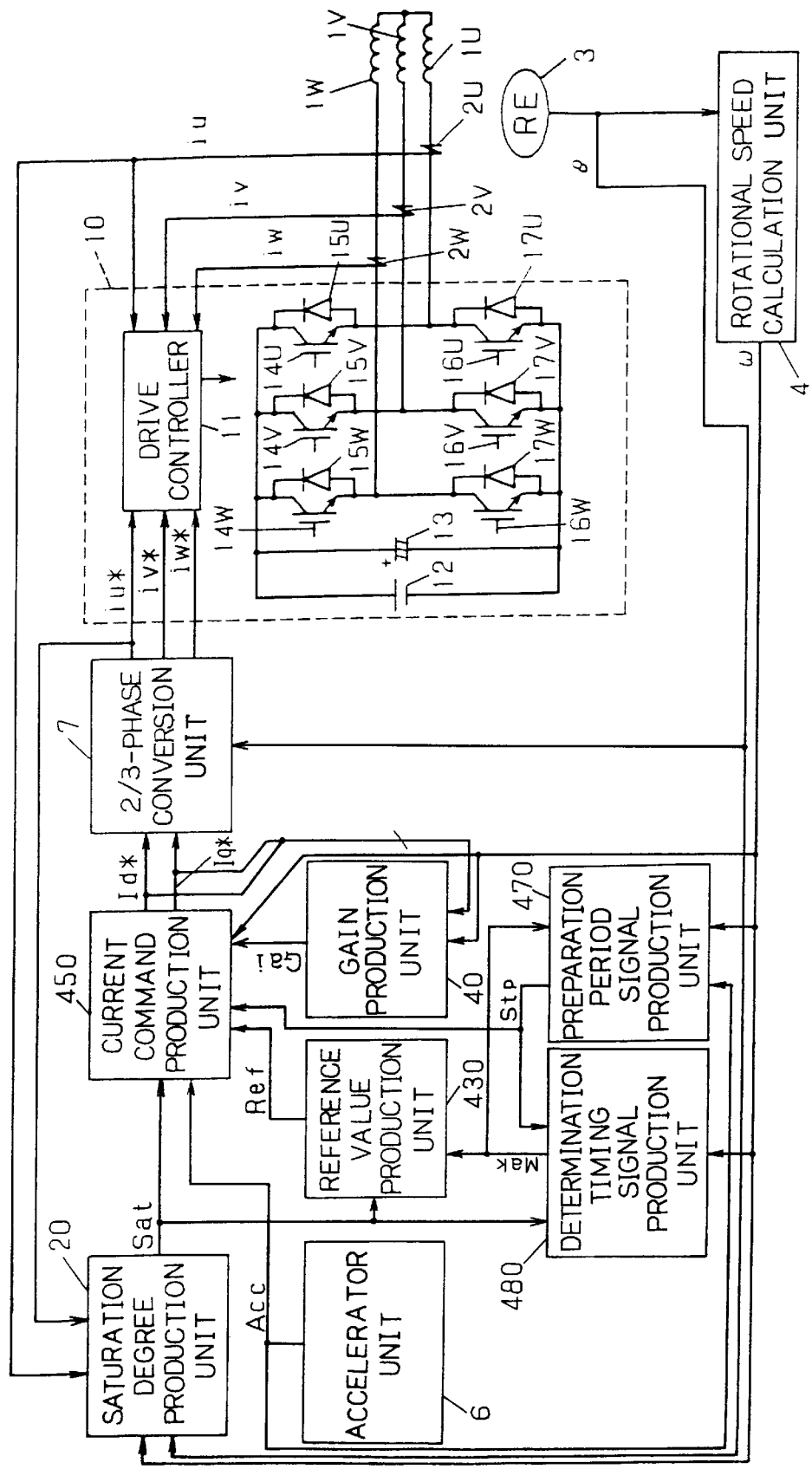
FIG. 17 is a block diagram showing the operation of a motor controller according to a fourth embodiment.

FIG. 17 is a block diagram showing the operation of a motor controller according to a fourth embodiment. This embodiment is different from the first embodiment only in that the drive voltage measuring unit 5 and the condition judging unit 25 are removed, while a preparation period signal production unit 470 and a determination timing signal production unit 480 are added, and in that the reference value production unit 430 and the current command production unit 450 are operated differently. The remaining parts of the configuration are similar to those of the first embodiment and will not be described.

[General configuration and operation]

The preparation period signal production unit 470 produces a preparation period signal Stp by a method described later, based on the rotational speed $\omega$, the accelerator value Acc and the determination timing signal Mak. The output of the preparation period signal production unit 470 is applied to the determination timing signal production unit 480 and the current command production unit 450. The determination timing signal production unit 480 produces a determination timing signal Mak by a method described later, based on the rotational speed $\omega$, the saturation degree Sat and the preparation period signal Stp. The output of the determination timing signal production unit 480 is applied to the preparation period signal production unit 470 and the reference value production unit 430. The reference value production unit 430 produces the reference value Ref by a method described later, based on the saturation degree Sat and the determination timing signal Mak and applies the output thereof to the current command production unit 450.

Also, as compared with the first embodiment, the rotational speed calculation unit 4 applies the rotational speed $\omega$ to both the preparation period signal production unit 470 and the determination timing signal production unit 480 but not to the reference value production unit 430. An accelerator unit 6 applies the accelerator value Acc also to the preparation period signal production unit 470. The saturation degree production unit 20 outputs the saturation degree Sat to both the determination timing production unit 480 and the reference value production unit 430. The current command production unit 450 produces a current command by a method described later, but does not apply any current command to the reference value production unit 430.

The remaining parts of the configuration are similar to those of the first embodiment and will not be described.

Figure 18:
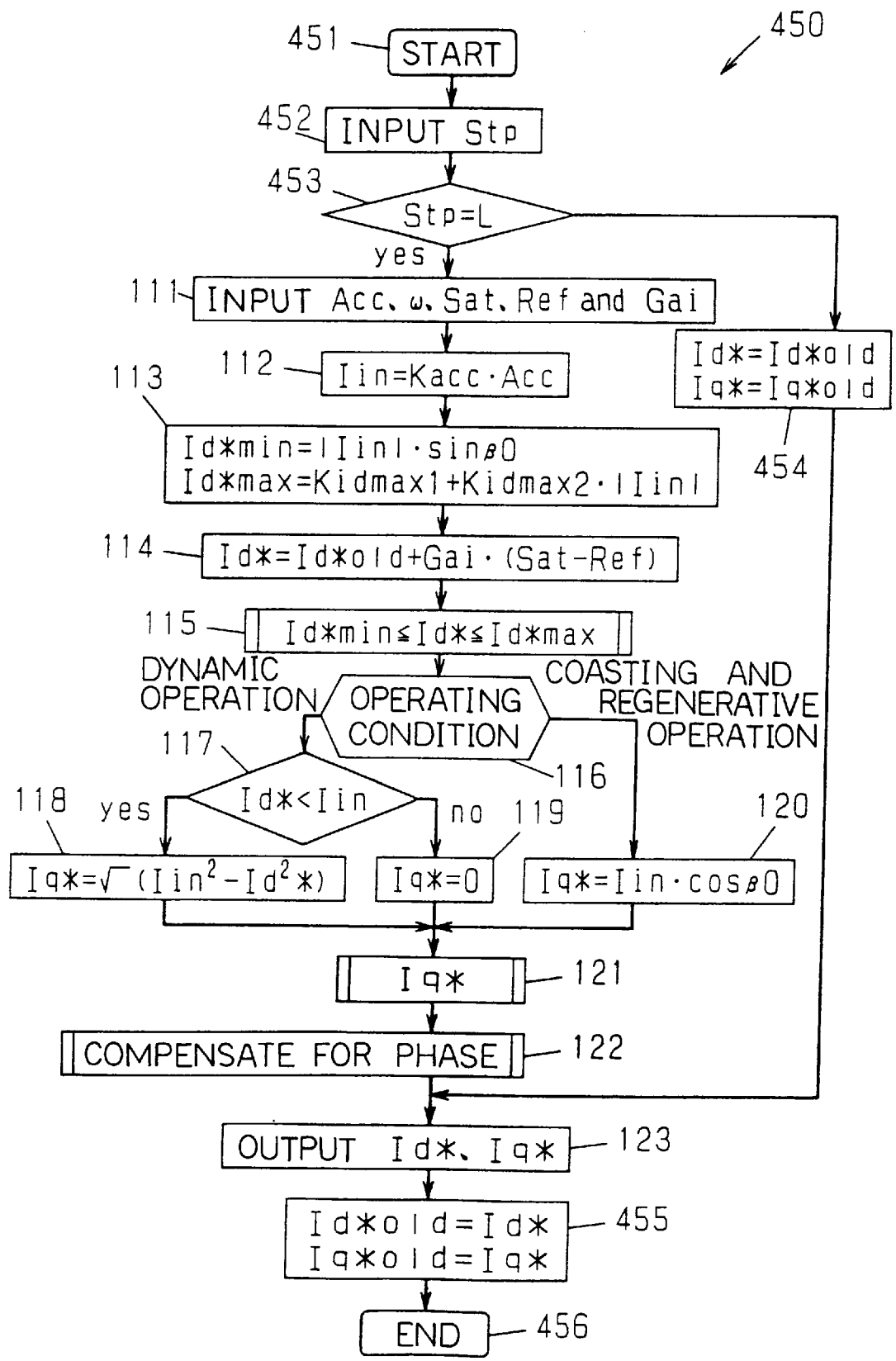
FIG. 18 is a flowchart showing the operation of the current command production unit according to the fourth embodiment.

Now, the operation of the current command production unit 450 will be explained. The current command production unit 450 holds the current commands (Id*, Iq*) at a constant value when the preparation period signal Stp is at H level during the preparation period. When the preparation period signal Stp is at L level and the preparation period is not prevailing, on the other hand, the current commands (Id*, Iq*) are produced in the same manner as in the first embodiment. FIG. 18 is a flowchart showing the operation of the current command production unit according to the fourth embodiment. A detailed explanation follows.

Step 451 starts producing a current command. Step 452 inputs the preparation period signal Stp.

Step 453 branches to the current command change mode and the current command no-change mode by the preparation period signal Stp. When the preparation period signal Stp is at L level (Stp=L), the current command change mode is involved and therefore step 111 is executed. When the preparation period signal Stp is at H level (Stp=H), on the other hand, the current command no-change mode is involved, and therefore step 454 is executed.

Steps 111 to 123 are similar to the corresponding steps in the first embodiment and therefore will not be described.

Step 454 produces current commands (Id*, Iq*) (current command no-change mode). The previous value Id*old is defined as the d-axis current command Id*, and the previous value Iq*old as the q-axis current command Iq*.

According to this embodiment, as described later, the preparation period signal production unit 470 does not raise the preparation period signal Stp to H level in initial state. Consequently, when the current command production unit 450 is activated first, the preparation period signal is not at H level. Since the current command change mode is executed, the setting of the initial values of the previous values Id*old and Iq*old is not required.

Step 455 holds the d-axis current command Id* and the q-axis current command Iq*. In order to use the d-axis current command Id* and the q-axis current command Iq* in the next step, the d-axis current command Id* is set to a new previous value Id*old and the q-axis current command Iq* to a new previous value Iq*old.

Step 456 terminates the production of the current commands. The remaining parts of the configuration are similar to those of the first embodiment and therefore will not be described.

[Operation of preparation period signal production unit 470]

A preparation period is defined as a time when the accelerator value Acc is constant in the low rotational speed range where the field-weakening control is not performed. The preparation period is continued until a reference value is determined (until the determination timing signal Mak rises to H level). In the case where the accelerator value Acc is changed during the preparation period, however, the preparation period is cancelled. A specific operation is described below.

Assume that the initial state is not in the preparation period and that the preparation period signal Stp is L (Stp=L).

In the case where the rotational speed $\omega$ is smaller than a preset value $\omega$stp ($\omega<\omega$stp) and the difference between maximum and minimum of the accelerator value Acc is smaller than a preset constant during a preset period, then a preparation period is judged to prevail and the preparation period signal Stp is raised to H (Stp=H).

In the case where the accelerator value Acc is changed or the determination timing signal Mak is raised to H while the preparation period signal is at H (Stp=H), the preparation period is cancelled and the preparation period signal is turned to L (Stp=L).

[Operation of determination timing signal production unit 480]

When the preparation period is prevailing, the rotational speed $\omega$ and the saturation degree Sat are monitored, so that when the gradient of the saturation degree Sat relative to the rotational speed $\omega$ suddenly changes, a pulse-like determination timing signal (positive logic signal) is generated. A specific operation is described below.

When the preparation period signal Stp rises to H, the operation is started, and the gradient of the saturation degree Sat with respect to the rotational speed $\omega$ is calculated and stored (as Ssat0). The gradient (Ssat) of the saturation degree Sat with respect to the rotational speed $\omega$ continues to be calculated subsequently, and when the ratio of the calculated gradient Ssat to the stored gradient Ssat0 exceeds a preset value Rsat (Ssat/Ssat0>Rsat), the determination timing signal is generated, thus terminating the operation.

In the case where the preparation period signal Stp lowers to L level in the process, the operation is suspended.

[Operation of reference value production unit 430]

The reference value Ref is updated based on the saturation degree Sat as of the time when the determination timing signal Mak is input. A specific operation is described below.

In initial state, a preset initial value is determined as a reference value Ref. After that, the operation is interrupted by the determination timing signal Mak. The saturation degree Sat0 at that time point is determined as a reference value Ref (Ref=Sat0).

[Effect of fourth embodiment]

Quality and secular variations of the component parts of the saturation degree production unit 20 cause the saturation degree Sat to vary from one brushless motor to another. As a result, once an optimum reference value Ref is set during the operation of the brushless motor, a high-efficiency field-weakening control can be realized free of the effects of quality or secular variations.

Figure 19A:
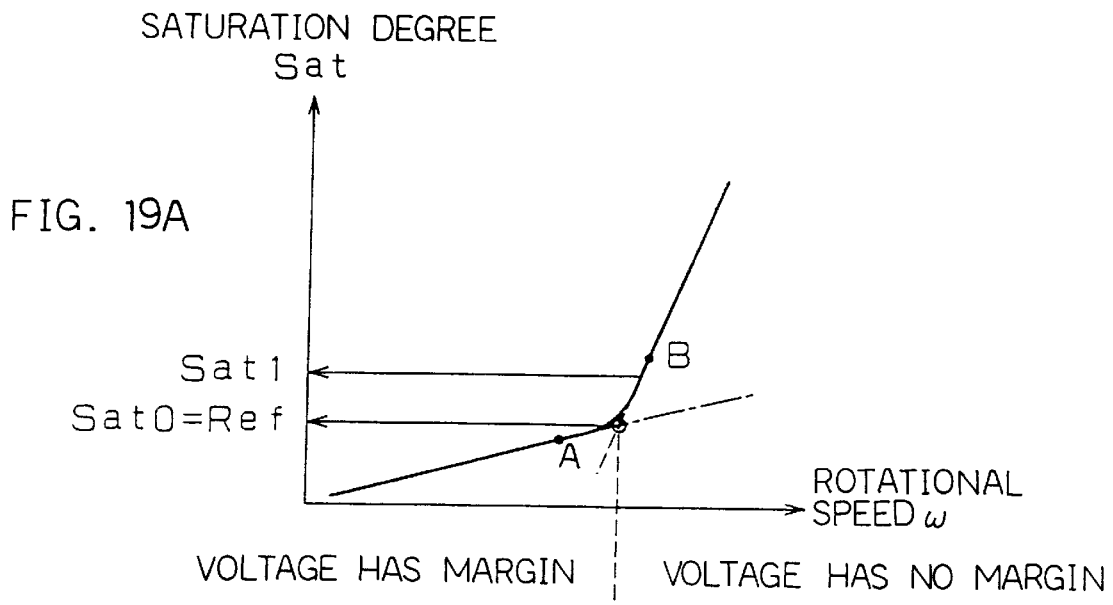
FIG. 19A is a diagram for explaining the relation between the rotational speed, the reference value and the saturation degree according to the fourth embodiment.
Figure 19B:
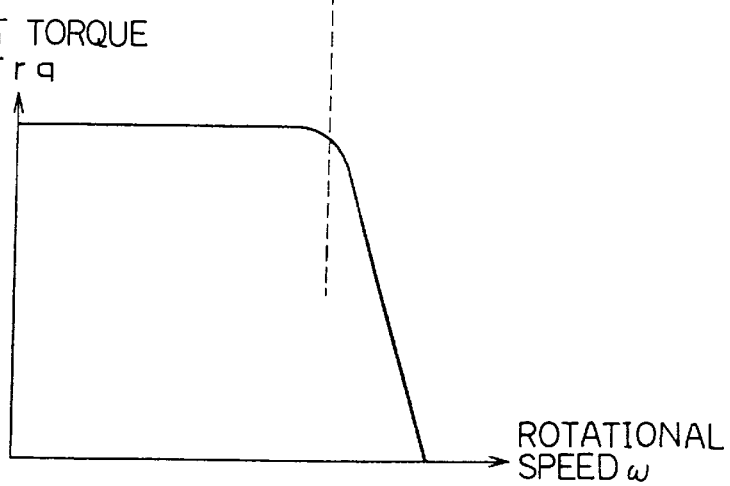
FIG. 19B is a diagram for explaining the relation between the rotational speed, the reference value and the output torque according to the fourth embodiment.

As shown in FIG. 19A, assume that the rotational speed $\omega$ is increased while maintaining the current command and the load constant. As long as the voltage has a margin in low rotational speed range, the saturation degree Sat gradually increases due to phase delay or the like. When the voltage margin is lost in high rotational speed range, the stator current iu no longer follows the stator current command iu* so that the saturation degree Sat sharply increases. Consequently, the gradient of the saturation degree Sat with respect to the rotational speed $\omega$ suddenly changes at a point intermediate between where the voltage has a margin and where it has no margin. As long as the saturation degree Sat is smaller than the saturation degree Sat0, therefore, the voltage has a margin, while when the saturation degree Sat is larger than the saturation degree Sat0, the voltage has no margin. For this reason, the d-axis current command Id* is changed upward or downward with the saturation degree Sat0 as a reference value Ref (Ref=Sat0), so that the operation is continued at a point intermediate between where the voltage has a margin and where the voltage has no margin.

In this way, the reference value Ref can be automatically set and the designing work is facilitated.

Assume that the rotational speed $\omega$ is increased while maintaining the current command and the load constant. When the voltage loses a margin, the output torque Trq decreases. The saturation degree Sat at the point where the gradient of the output torque Trq relative to the rotational speed $\omega$ suddenly changes can be used as a reference value Ref. As another alternative, in view of the fact that the angular acceleration changes relative to the rotational speed $\omega$, the saturation degree Sat at the point where the angular acceleration changes can be used as a reference value Ref.

Further, although the present embodiment uses as a reference value Ref the saturation degree Sat0 at the point where the gradient of the saturation degree Sat with respect to the rotational speed $\omega$ changes, the invention is not limited to such a case but is applicable also to the case where the saturation degree Sat0 at or in the neighborhood of the point where the gradient of the saturation degree Sat changes is used as a reference value Ref. Especially, consider the case where a value Sat1 (FIG. 19) slightly larger than the saturation degree Sat0 at the point where the gradient undergoes a change is used as a reference value Ref. In such a case, the output torque Tr somewhat decreases. Nevertheless, when the rotational speed $\omega$ changes from a high to a low value (B→A), the difference (Ref−Sat) between the reference value Ref and the saturation degree is increased, thereby realizing early convergence of the d-axis current command Id*.

Also, the initial value of the reference value Ref can be determined by the method of the first embodiment, or the reference value Ref determined by the method of the present embodiment can be corrected by the method of the first embodiment.

According to this embodiment, the reference value Ref continues to be produced once the accelerator value Acc becomes constant in low rotational speed range. Alternatively, the operation can be continued until the reference value Ref is produced once after starting the operation, or the operation can be performed to store the reference value Ref only at the time of shipment.

In the above-mentioned first to fourth embodiments, the current command production units 50, 250, 450, as seen from equation 8, changes the d-axis current command Id* upward or downward according to the saturation degree Sat. Increasing the d-axis current command Id* is equivalent to advancing the current phase command β*. Consequently, the current phase command β* can changed upward or downward, as shown in equation 21, by properly designing the current command production unit, where β*old is the previous value of the current phase command β*.

$$\beta^* = \beta^* old + Gai \cdot (Sat - Ref) \quad (21)$$

Also, in the above-mentioned embodiment, the d-axis current command Id* of equation 8 and the gain Gai of equation 20 are produced only by integration. In spite of this, the proportional operation, the integration and/or the differentiation can be used according to the present invention. The production of the d-axis current command Id* using the proportional, integrating and differential operations, for example, is shown in equation 22, where Id*(i) is the i-th d-axis current command Id*, e(i) is the difference (Sat−Ref) between the i-th saturation degree Sat and the reference value Ref, KI is an integration gain, KP is a proportional gain, and KD is a differential gain. Characters (i−1), (i−2) designate the operation immediately preceding to the i-th operation and the operation immediately preceding to the i-th operation but one, respectively. In the above-mentioned embodiment, a configuration is shown in which not only KI but also KP and KD are 0. The invention is applicable also to the case in which at least one of KI, KP and KD is included and at least one of them thus included is corrected or determined from the vibration amplitude Vib.

$$Id*(i) - Id*(i-1) = KI \cdot e(i) + \\ KP \cdot \{e(i) - e(i-1)\} + \\ KD \cdot \{e(i) - 2e(i-1) + e(i-2)\} \quad (22)$$

According to the first to fourth embodiments described above, the current command production units 50, 250, 450 are such that the d-axis current command Id* is changed upward or downward by the saturation degree Sat as seen from equation 8. Increasing the d-axis current command Id* is equivalent to decreasing the q-axis current command iq*. As a result, the q-axis current command Iq* can alternatively be changed downward or upward by appropriately designing the current command production unit.

In the first, second and fourth embodiments, the magnitude of the reference value Ref was changed by the reference value production units 30, 430. Increasing the saturation degree Sat is equivalent to decreasing the reference value Ref. Thus, changing the magnitude of the reference value Ref is substantially equivalent to changing the magnitude of the saturation degree Sat. The invention therefore is also applicable to the case where the magnitude of the saturation degree Sat is changed. A specific method corresponding to the reference value production unit 30 is as shown in equation 23.

$$Sat = Sat/(Krefa \cdot Krefb \cdot Krefc \cdot Krefd) \quad (23)$$

In the first to fourth embodiments, the current command production units 50, 250, 450 change the d-axis current command Id* upward or downward according to the saturation degree Sat, as seen from equation 8. In spite of this, the extent to which the d-axis current command Id* is changed upward or downward for each calculation can be limited. Also, a dead zone or a hysteresis can be provided. As a result, the control can be stabilized.

Also, in the drawings for explaining the above-mentioned embodiments, the brushless motor is assumed to be an IPM motor and the current phase β0 for realizing the maximum torque is not 0. The present invention, however, is not limited to the IPM motor, but can be applied to a SPM motor and any other brushless motors having a saliency.

The above-mentioned motor controller is not for controlling the brushless motor alone, but the invention is applicable with equal effect to the control of other motors such as the synchronous reluctance motor.

The stator current commands iu*, iv*, iw* and the stator currents iu, iv, iw have three phases. As an alternative, two phases can be used and added to each other to obtain the remaining one phase with a different sign.

The embodiments described above are such that the feedback control is used in such a manner as to supply the stator currents iu, iv, iw in accordance with the stator current commands iu*, iv*, iw*. An alternative is to determine the d-axis current Id and the q-axis current Iq using at least two of the stator currents iu, iv, iw and to effect the feedback control in such a manner that the d-axis current Id and the q-axis current Iq flow in response to the d-axis current command Id* and the q-axis current command Iq*, respectively.

Although the IBGT is used in the drive unit 10, another drive device such as a bypolar transistor or a MOS-FET can be used with equal effect. Also, in place of the DC power supply as shown above, an AC power rectified into a DC power can be used.

We claim:

1. A motor controller comprising:
   drive means for supplying power to the stator windings of a motor based on a current command;
   stator current detection means for detecting the stator current flowing in said stator windings;
   saturation degree production means for producing a saturation degree data indicating the extent to which said stator current deviates from said current command,
   reference value production means for producing a reference value of said saturation degree;
   gain production means for producing a gain data indicating the rate at which said current command is changed; and
   current command production means for producing said current command data based on said saturation degree, said reference value and said gain;
   wherein said gain production means produces said gain data based on at least one of the rotational speed of said motor and said current command.

2. A motor controller according to claim 1,
   wherein said gain production means reduces said gain with the advance of the current phase of said current command.

3. A motor controller according to claim 1,
   wherein said gain production means reduces said gain with the increase in the rotational speed of said motor.

4. A motor controller according to claim 1,
   wherein said gain production means reduces said gain with the increase in the absolute value of said current command.

5. A motor controller comprising:

drive means for supplying power to the stator windings of a motor based on a current command;

stator current detection means for detecting the stator current flowing in said stator windings;

saturation degree production means for producing a saturation degree data indicating the extent to which said stator current deviates from said current command, reference value production means for producing a reference value of said saturation degree;

gain production means for producing a gain data indicating the rate at which said current command is changed;

current command production means for producing said current command data based on said saturation degree, said reference value and said gain;

steady state judging means for judging whether said motor is in steady state or not; and vibration amplitude calculation means for calculating a vibration amplitude indicating the extent of vibration based on the vibration of at least one of said current command, said saturation degree, said stator current, the rotational speed of said motor, and the output torque of said motor;

wherein said gain production means produces said gain data based on said vibration amplitude under said steady state.

6. A motor controller according to claim 5, wherein said vibration amplitude calculation means uses the vibration amplitude of said saturation degree as said vibration amplitude; and wherein said gain production means produces said gain data in such a manner as to reduce said gain with the increase in said vibration amplitude.

7. A motor controller according to claim 5, wherein said current command production means produces a q-axis current command data and a d-axis current command data;

wherein said vibration amplitude calculation means uses the vibration amplitude of said d-axis current command as said vibration amplitude; and wherein said gain production means produces said gain data in such a manner as to reduce said gain with the increase in said vibration amplitude.

8. A motor controller comprising:

drive means for supplying power to the stator windings of a motor based on a current command;

stator current detection means for detecting the stator current flowing in said stator windings;

saturation degree production means for producing a saturation degree data indicating the extent to which said stator current deviates from said current command, reference value production means for producing a reference value of said saturation degree;

gain production means for producing a gain data indicating the rate at which said current command is changed; and current command production means for producing said current command data based on said saturation degree, said reference value and said gain;

wherein said reference value production means produces said reference value based on at least one of the rotational speed of said motor, said current command and the drive voltage applied to said drive means.

9. A motor controller according to claim 8, wherein said current command production means produces a q-axis current command data and a d-axis current command data; and wherein said reference value production means increases said reference value with the increase in said q-axis current command.

10. A motor controller according to claim 8, wherein said reference value production means reduces said reference value with the advance of the current phase of said current command.

11. A motor controller comprising:

drive means for supplying power to the stator windings of a motor based on a current command;

stator current detection means for detecting the stator current flowing in said stator windings;

saturation degree production means for producing a saturation degree data indicating the extent to which said stator current deviates from said current command, reference value production means for producing a reference value of said saturation degree;

gain production means for producing a gain data indicating the rate at which said current command is changed;

current command production means for producing said current command data based on said saturation degree, said reference value and said gain;

preparation period signal production means for producing a preparation period signal indicating a preparation period for determining said reference value; and determination timing signal production means for producing a determination timing signal indicating the timing for determining said reference value;

wherein said current command production means maintains said current command at a constant level when said preparation period signal is being generated; and wherein said reference value production means produces said reference value based on said saturation degree when said determination timing signal is produced.

12. A motor controller according to claim 11, wherein said preparation period signal production means generates said preparation period signal in the case where the rotational speed of said motor is lower than a preset rotational speed and in the case where the torque command indicating the output torque generated by the motor is constant, and wherein the generation of said preparation period signal is cancelled in the case where said determination timing signal is generated and in the case where said torque command is changed.

13. A motor controller according to claim 11, wherein said determination timing signal production means produces said determination timing signal when the gradient of said saturation degree with respect to the rotational speed of said motor is changed.

14. A motor controller according to claim 11, wherein said determination timing signal production means produces said determination timing signal when the acceleration of said motor is changed.

15. A motor controller comprising:

drive means for supplying power to the stator windings of a motor based on a current command;

stator current detection means for detecting the stator current flowing in said stator windings;

saturation degree production means for producing a saturation degree data indicating the extent to which said stator current deviates from said current command, based on said current command and said stator current;

reference value production means for producing a reference value of said saturation degree;

gain production means for producing a gain data indicating the rate at which said current command is changed;

current command production means for producing said current command data based on said saturation degree, said reference value and said gain; and condition judging means for producing the condition index data indicating the operating condition of said motor;

wherein said gain production means produces said gain data based on said condition index.

16. A motor controller comprising:

drive means for supplying power to the stator windings of a motor based on a current command;

stator current detection means for detecting the stator current flowing in said stator windings;

saturation degree production means for producing a saturation degree data indicating the extent to which said stator current deviates from said current command, reference value production means for producing a reference value of said saturation degree;

gain production means for producing a gain data indicating the rate at which said current command is changed;

current command production means for producing said current command data based on said saturation degree, said reference value and said gain; and condition judging means for producing a condition index data indicating the operating condition of said motor;

wherein said reference value production means produces said reference value based on said condition index.

17. A motor controller according to claim 15, wherein said condition judging means produces said condition index data based on the rate at which the rotational speed of said motor is changed.

18. A motor controller according to claim 16, wherein said condition judging means produces said condition index data based on the rate at which the rotational speed of said motor is changed.

19. A motor controller according to claim 15, wherein said condition judging means produces said condition index data based on the rate at which the torque command or the motor output command indicating the output torque generated in said motor is changed.

20. A motor controller according to claim 16, wherein said condition judging means produces said condition index data based on the rate at which the torque command or the motor output command indicating the output torque generated in said motor is changed.

21. A motor controller comprising:

drive means for supplying power to the stator windings of a motor based on a current command: and current command production means for producing said current command data;

wherein said current command production means produces a q-axis current command data and a d-axis current command data; and said system further comprising q-axis current command correction means for producing a q-axis current correction amount based on at least one of the rotational speed of said motor and said current command and correcting said q-axis current command by said q-axis current correction amount.

22. A motor controller comprising:

drive means for supplying power to the stator windings of a motor based on a current command;

stator current detection means for detecting the stator current flowing in said stator windings;

saturation degree production means for producing a saturation degree data indicating the extent to which said stator current deviates from said current command, reference value production means for producing a reference value of said saturation degree;

gain production means for producing a gain data indicating the rate at which said current command is changed; and current command production means for producing said current command data based on said saturation degree, said reference value and said gain;

wherein said current command production means produces a q-axis current command data and a d-axis current command data;

said system further comprising q-axis current command correction means for producing a q-axis current correction amount based on at least one of the rotational speed of said motor and said current command and correcting said q-axis current command by said q-axis current correction amount.

23. A motor controller according to claim 19, wherein said q-axis current command correction means increases said q-axis current correction amount with the increase in the rotational speed of said motor.

24. A motor controller according to claim 20, wherein said q-axis current command correction means increases said q-axis current correction amount with the increase in the rotational speed of said motor.

25. A motor controller according to claim 19, wherein said-q-axis current command correction means reduces said q-axis current correction amount with the increase in said q-axis current command.

26. A motor controller according to claim 20, wherein said q-axis current command correction means reduces said q-axis current correction amount with the increase in said q-axis current command.

27. A motor controller comprising:

drive means for supplying power to the stator windings of a motor based on a current command; and current command production means for producing said current command data;

wherein the amount of magnetic fluxes generated is controlled by changing the current phase of said current command;

wherein said current command production means produces a q-axis current command data and a d-axis current command data; and wherein the current phase of said current command is changed in such a manner as to maintain the product of said q-axis current command and said d-axis current command at a constant level.

28. A motor controller comprising:

drive means for supplying power to the stator windings of a motor based on a current command;

stator current detection means for detecting the stator current flowing in said stator windings;

saturation degree production means for producing a saturation degree data indicating the extent to which said stator current deviates from said current command, reference value production means for producing a reference value of said saturation degree;

gain production means for producing a gain data indicating the rate at which said current command is changed; and current command production means for producing said current command data based on said saturation degree, said reference value and said gain;

wherein said current command production means produces a q-axis current command data and a d-axis current command data, and changes said current phase in such a manner as to maintain the product of said q-axis current command and said d-axis current command at a constant level.

29. A motor controller comprising:

drive means for supplying power to the stator windings of a motor based on a current command;

current command production means for producing said current command data; and phase compensation amount calculation means for calculating a phase compensation amount indicating the phase delay of the stator current flowing in said stator winding relative to said current command;

wherein said phase compensation amount calculation means increases said phase compensation amount with the increase in the rotational speed of said motor; and wherein said current command production means produces a q-axis current command data and a d-axis current command data, compensates for said q-axis current based on the product of said phase compensation amount and said d-axis current command, and compensates for said d-axis current based on the product of said phase compensation amount and said q-axis current command.

30. A motor controller comprising:

drive means for supplying power to the stator windings of a motor based on a current command;

stator current detection means for detecting the stator current flowing in said stator windings;

saturation degree production means for producing a saturation degree data indicating the extent to which said stator current deviates from said current command, reference value production means for producing a reference value of said saturation degree;

gain production means for producing a gain data indicating the rate at which said current command is changed;

current command production means for producing said current command data based on said saturation degree, said reference value and said gain; and current phase delay calculation means for calculating the phase delay of said stator current relative to said current command in such a manner as to increase the phase delay of said current command with the increase in the rotational speed of said motor;

wherein said current command production means produces a q-axis current command data and a d-axis current command data, compensates for said q-axis current based on the product of said phase delay and said d-axis current command, and compensates for said d-axis current based on the product of said phase delay and said q-axis current command.

* * * * *